(12) United States Patent
Sisco

(10) Patent No.: US 8,542,411 B2
(45) Date of Patent: Sep. 24, 2013

(54) CREATING AND PROCESSING A MARK-ABLE DOCUMENT

(75) Inventor: Richard Kent Sisco, Lynden, WA (US)

(73) Assignee: Seiko Epson Corporation, Tokyo (JP)

( * ) Notice: Subject to any disclaimer, the term of this patent is extended or adjusted under 35 U.S.C. 154(b) by 404 days.

(21) Appl. No.: 12/939,813

(22) Filed: Nov. 4, 2010

(65) Prior Publication Data

US 2011/0235128 A1    Sep. 29, 2011

Related U.S. Application Data

(60) Provisional application No. 61/317,179, filed on Mar. 24, 2010.

(51) Int. Cl.
*H04N 1/40* (2006.01)
*G06K 19/06* (2006.01)
*G06K 9/34* (2006.01)
*G06F 17/00* (2006.01)

(52) U.S. Cl.
USPC ......... 358/3.28; 358/1.9; 358/3.26; 358/1.15; 235/494; 235/495; 382/175; 715/209

(58) Field of Classification Search
None
See application file for complete search history.

(56) References Cited

U.S. PATENT DOCUMENTS

| | | | | |
|---|---|---|---|---|
| 4,937,439 A | * | 6/1990 | Wanninger et al. | 235/456 |
| 5,140,139 A | * | 8/1992 | Shepard | 235/456 |
| 8,358,964 B2 | * | 1/2013 | Radtke et al. | 434/353 |

* cited by examiner

*Primary Examiner* — Steven Kau

(57) ABSTRACT

The invention enables creating a mark-able document for a user to mark, and recognizing and processing the user-marked mark-able document to generate an accurate user-readable result that has broad application. The application program used to create, process, and generate a printed output based on the processing includes an array of functionality to create a wide variety of mark-able documents.

10 Claims, 25 Drawing Sheets

| Id | Header | Result | Tees | Yards | Hcp | Par | Strokes | Putts | Pen | DIF | GSB |
|---|---|---|---|---|---|---|---|---|---|---|---|
| 1 | 1 | 6 | | 352 | 13 | 4 | 5 | 2 | | 1 | |
| 2 | 2 | 4 | | 431 | 3 | 4 | 4 | 2 | | | |
| 3 | 3 | 6 | | 379 | 9 | 4 | 5 | 2 | | | 1 |
| 4 | 4 | 4 | | 404 | 7 | 4 | 4 | 1 | | | |
| 5 | 5 | 5 | | 183 | 17 | 3 | 4 | 2 | | | 1 |
| 6 | 6 | 4 | | 487 | 1 | 5 | 4 | 2 | | | |
| 7 | 7 | 5 | | 355 | 11 | 4 | 4 | 2 | | 1 | |
| 8 | 8 | 3 | | 204 | 15 | 3 | 3 | 1 | | | |
| 9 | 9 | 5 | | 526 | 5 | 5 | 5 | 1 | | 1 | |
| 10 | 10 | 4 | | 370 | 14 | 4 | 4 | 1 | | | |
| 11 | 11 | 7 | | 564 | 2 | 5 | 6 | 2 | | 1 | |
| 12 | 12 | 3 | | 363 | 12 | 4 | 3 | 2 | | | |
| 13 | 13 | 5 | | 444 | 4 | 4 | 4 | 2 | | 1 | |
| 14 | 14 | 4 | | 156 | 18 | 3 | 4 | 2 | | | |
| 15 | 15 | 6 | | 425 | 6 | 4 | 5 | 1 | | | 1 |
| 16 | 16 | 3 | | 207 | 16 | 3 | 3 | 1 | | | |
| 17 | 17 | 5 | | 513 | 8 | 5 | 5 | 2 | | 1 | |
| 18 | 18 | 4 | | 453 | 10 | 4 | 4 | 2 | | | |
| 700 | 700 | 1 | 1 | | | | | | | | |

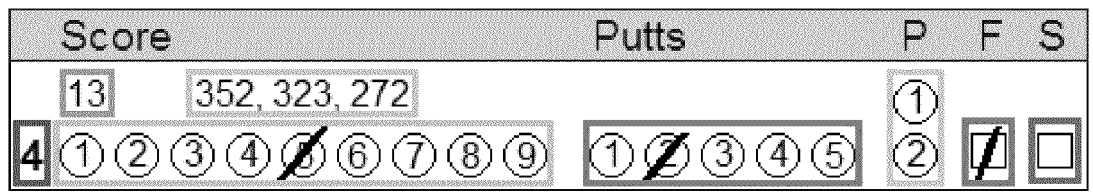
FIG. 13
| Id | Header | Result | Tees | Yards | Hcp | Par | Strokes | Putts | Pen | DIF | GSB |
|----|--------|--------|------|-------|-----|-----|---------|-------|-----|-----|-----|
| 1  | 1      | 6      |      | 352   | 13  | 4   | 5       | 2     |     | 1   |     |
FIG. 14
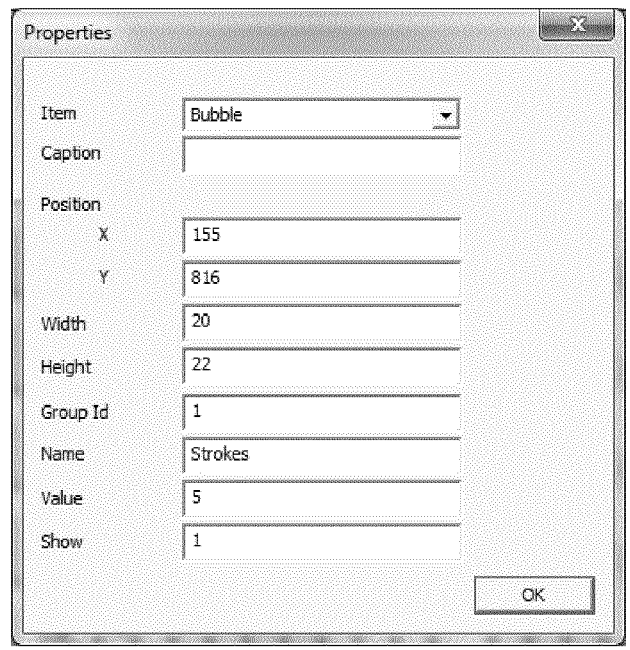
FIG. 15

| Id | Over | Even | Bogey | Double | Triple | Blow... | Pars | Birdies | Eagles | 1Putt | 2Putts |
|---|---|---|---|---|---|---|---|---|---|---|---|
| 1 | 1 | 1 | 1 | | | | | | | | 1 |
| 2 | | | | | | | 1 | | | | 1 |
| 3 | 1 | 1 | 1 | | | | | | | | 1 |
| 4 | | | | | | | 1 | | | 1 | |
| 5 | 1 | 1 | 1 | | | | | | | | 1 |
| 6 | | -1 | | | | | | 1 | | | 1 |
| 7 | | | | | | | 1 | | | | 1 |
| 8 | | | | | | | 1 | | | 1 | |
| 9 | | | | | | | 1 | | | 1 | |
| 10 | | | | | | | 1 | | | 1 | |
| 11 | 1 | 1 | 1 | | | | | | | | 1 |
| 12 | | -1 | | | | | | 1 | | | 1 |
| 13 | | | | | | | 1 | | | | 1 |
| 14 | 1 | 1 | 1 | | | | | | | | 1 |
| 15 | 1 | 1 | 1 | | | | | | | 1 | |
| 16 | | | | | | | 1 | | | 1 | |
| 17 | | | | | | | 1 | | | | 1 |
| 18 | | | | | | | 1 | | | | 1 |

FIG. 16

| Hole  | 1  | 2 | 3 | 4 | 5  | 6 | 7  | 8  | 9 | Out |
|-------|----|---|---|---|----|---|----|----|---|-----|
| Hcp   | 13 | 3 | 9 | 7 | 17 | 1 | 11 | 15 | 5 |     |
| Par   | 4  | 4 | 4 | 4 | 3  | 5 | 4  | 3  | 5 | 36  |
| Score | 5  | 5 | 5 | 4 | 5  | 4 | 4  | 3  | 5 | 40  |
| Putts | 1  | 1 | 2 | 1 | 2  | 2 | 2  | 1  | 3 | 15  |

| Id | Score | Putts |
|----|-------|-------|
| 1  | 5     | 1     |

| _RoundId | _RecordId | _CourseId | _EventId | _Entered | _Division | _TypeName | _LastName | _FirstName | _Teez | _Hole01 |
|---|---|---|---|---|---|---|---|---|---|---|
| 15 | 122 | 2 | 101 | 2010-08-05 | 1 | Score | McGowan | Morgan | 2 | 5 |
| 17 | 124 | 2 | 101 | 2010-08-05 | 3 | Score | King | Ted | 2 | 4 |
| 18 | 125 | 2 | 101 | 2010-08-05 | 1 | Score | King | Warren | 2 | 4 |
| 19 | 126 | 2 | 101 | 2010-08-05 | 3 | Score | Eisen | Vince | 2 | 4 |
| 20 | 127 | 2 | 101 | 2010-08-05 | 3 | Score | Whelchel | Ken | 2 | 5 |
| 21 | 128 | 2 | 101 | 2010-08-05 | 3 | Score | Trowse | Dan | 2 | 4 |
| 22 | 129 | 2 | 101 | 2010-08-05 | 3 | Score | Callahan | Dan | 3 | 6 |

FIG. 38

CREATING AND PROCESSING A MARK-ABLE DOCUMENT

BACKGROUND

1. Field of Invention

The present invention relates to creating a mark-able document and processing such document containing user-made marks in any of a variety of computing environments.

2. Description of Related Art

Typical mark-able documents in existence today are often processed with optical mark readers. Such a technique is configured to read user-made marks in predefined locations on card stock forms or the like, or by evaluating areas on regular paper, e.g., standard copy paper, derived from stored information that define these locations on the page.

While useful in different applications, card stock forms ("scan forms") and copy paper based mark-able forms have limitations and trade offs. A scan form is more expensive than a copy paper based mark-able form, but the scan form does not allow for custom printing on the form itself and typically contains only one kind of mark-able item, usually bubbles, whereas a copy paper based mark-able form is more flexible in terms of use. While thickness of a scan form makes it less likely to get bent out of shape, its thickness can pose a problem for some document feeders, especially when handling multiple forms. Thickness is typically not a problem for a copy paper based mark-able form but such a form is more prone to recognition and processing errors.

Scan forms are typically evaluated by running a pre-marked form through a scanning device to initialize an on board memory with the answer key. Similarly, copy paper based mark-able forms require an evaluator to first open and load into memory those files that identify the location of the mark-able areas and the expected values before processing any scanned images. In both cases, only those images that have their associated answer keys pre-loaded can be processed correctly.

What is lacking, but needed, is a mark-able document that retains the processing accuracy of scan forms but is customizable and less expensive to produce.

SUMMARY OF INVENTION

An object of the invention is to overcome at least some of the drawbacks of the prior art as described above.

One aspect of the invention is embodied in a method for creating a mark-able document. The method comprises creating a definition file defining the content and layout of, and instructions for processing user-made-marks on, the mark-able document; generating a globally unique identification (GUID) associated with the definition file; storing the definition file and the GUID; creating a two-dimensional representation of the GUID, the two-dimensional identification containing a plurality of blocks, each of which encodes either a first state or second state, and which collectively encode an identifier, the two-dimensional identification being positioned along an edge of the document and being configured to detect and correct any skew that occurred during generation of a scanned image of the document after having been marked by a user and find the stored definition file from among other stored definition files; and outputting the mark-able document.

In some embodiments, creating of the definition file comprises inputting at least one category, a plurality of mark-able items associated with the at least one category, and at least one formula defining relationships between the at least one category and the plurality of mark-able items. Preferably, the inputting is performed using an interactive window displayed on a display associated with a computing device.

After a mark-able document is created, it is printed for use by a user, who marks the document accordingly. The user-marked mark-able document is then ready to be processed according to embodiments of the invention.

Thus, another aspect of the invention includes scanning the mark-able document containing user-marks and generating and saving an image thereof; identifying the GUID; reading and decoding the two-dimensional identification; accessing the definition file associated with the identified GUID and two-dimensional identification; analyzing the image based on the definition file and the user-made marks on the mark-able document; and outputting a result of the image analyzing operation.

Preferably, identifying the GUID comprises decoding the two-dimensional identification for the mark-able document.

Some embodiments involve using the decoded two-dimensional identification, detecting whether the image is skewed, and if so, de-skewing the image.

The creating and/or the processing of a mark-able document as described above may be carried out according to a program of instructions embodied on a non-transitory, computer or device readable medium.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIG. 11 shows an exemplary RecordSet generated from scraping (reading) raw data from a user-marked golf card marksheet.

FIG. 12 shows an image of the user-marked golf card from which the RecordSet of FIG. 11 was scraped.

FIGS. 13 and 14 show corresponding portions of FIGS. 11 and 12 respectively.

FIG. 15 shows the values set in an exemplary properties dialog box for the BUBBLE item in the 5$^{th}$ position of the "Score" section of FIG. 13.

FIG. 16 shows a RecordSet as calculated results based on a particular set of formulas.

FIG. 17 shows an example of a TABLE item that contains printed results of a marked up and processed golf score card marksheet.

FIG. 18 shows the grouping of BUBBLE items for purposes of processing by marksheet application software.

FIGS. 19 and 20 show a portion of marksheet after marking by a user and after processing of the marks respectively.

FIG. 21 shows the RecordSet containing data retrieved from the processed marksheet shown in FIG. 20.

FIG. 25 shows an exemplary input form that can be used to modify the content of the golf card marksheet template shown in FIG. 24.

FIG. 26 shows a dialog box for creating a quiz marksheet.

FIG. 38 shows an example of a table populated with data from a CLOUD item.

DESCRIPTION OF THE PREFERRED EMBODIMENTS

The creation and processing of a mark-able document, which can take any of a variety of forms, will now be described in greater detail with reference to the accompanying drawings. Numerous embodiments, variations and examples are provided.

Figure 1:
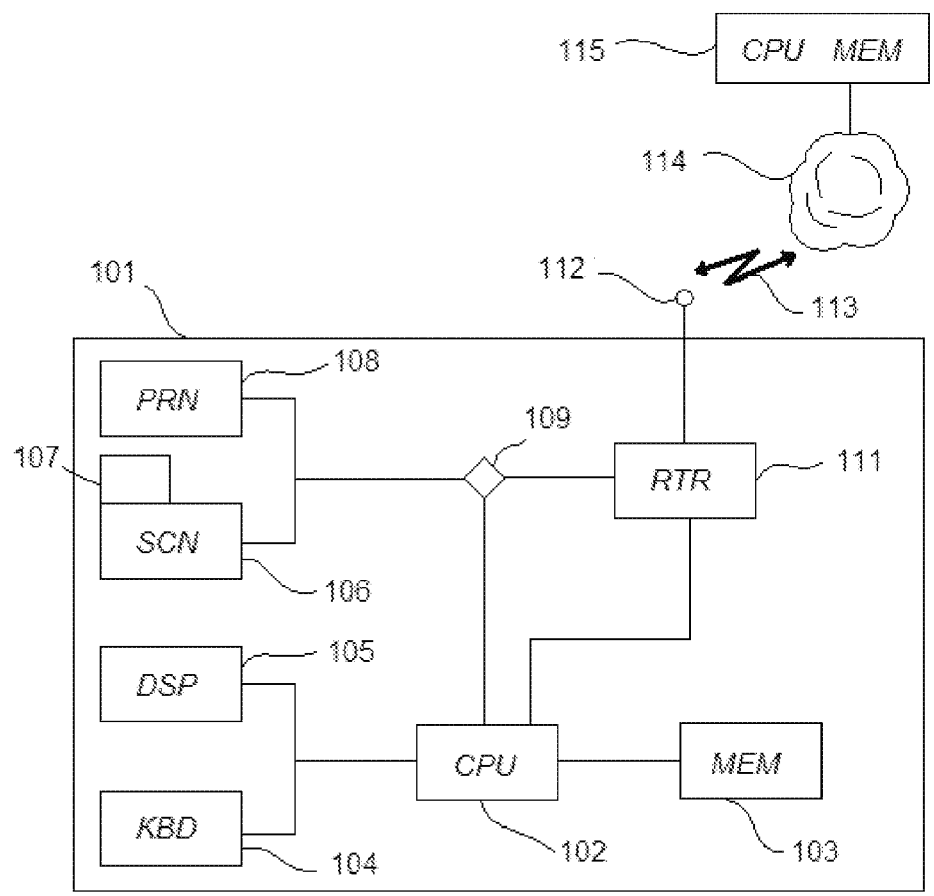
FIG. 1 shows a schematic block diagram of a computing environment according to embodiments of the present invention.

Referring to FIG. 1, an exemplary system 101 in which aspects of the present invention may be implemented is illustrated. In the illustrated embodiment, system 101 comprises a processor (CPU) 102, memory 103, as well as input/output units in the forms of a keyboard 104, a display monitor 105, a scanner 106, which may be equipped with an automatic document feeder 107, and a printer 108. The basic details of these components are well known, and hence will not be discussed further. Additional detail will be presented in the context of specific embodiments as necessary to understand the same.

Data captured by scanner 106 or processed by processor 102, according to aspects of the invention to be further explained below, is represented by file 109. Depending on where in the process one is at, data file 109 can be stored locally in memory 103, retrieved for viewing or browsing, printed by printer 108, or transferred to a cloud computing environment 114. To that end, system 101 further includes a router 111, which interfaces with an external communication device 112 that is adapted establish a network connection 113 to a network such as the Internet. From there, system 101 is capable of communicating with cloud computing environment 114, such as any of those provided by Amazon®, Google®, Microsoft®, etc. Within cloud 114, data file 109 can also be viewed, printed or stored. Additional detail regarding the cloud and its associated computing environment is provided below.

The instructions for creating and processing a mark-able document according to the present invention preferably reside in the form of software, which may reside together with other software components necessary for operation of system 101, in memory 103. Any type of conventional removable memory may be used, such as a hard drive, semi-permanent storage chip such as a flash memory card, or cloud storage. The software instructions for creating and processing the mark-able item may be provided in memory 103 in any number of ways, including distribution via cloud 114 and its storage 115. That is, the program code for implementing various aspects of the present invention may be considered as a form of processing in the cloud via the Internet or other type of remote computing system.

Figure 2:
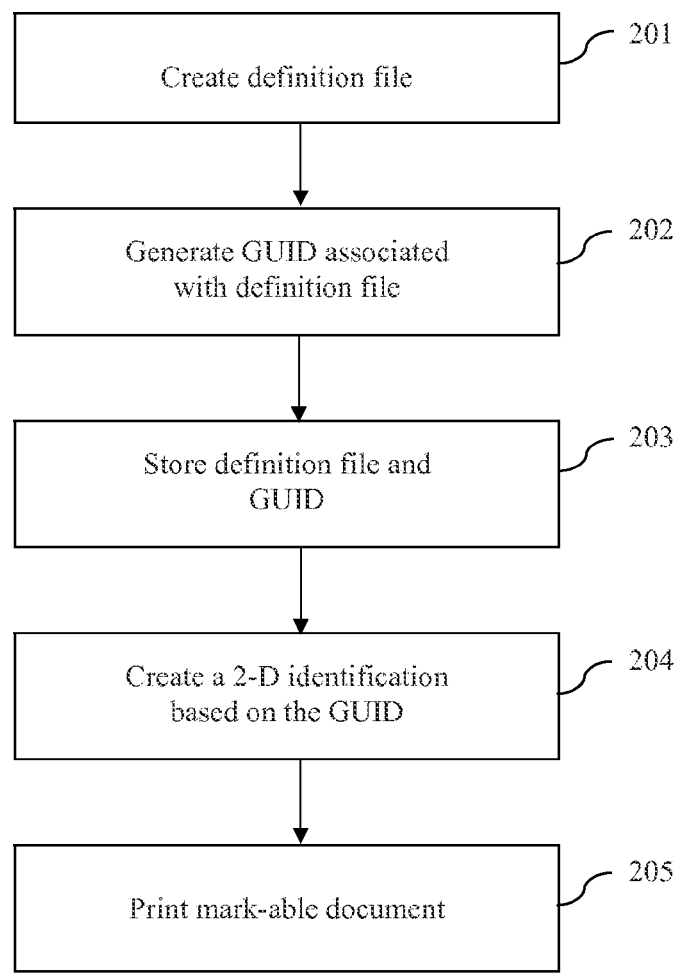
FIG. 2 is a flow chart showing steps in connection with creating a mark-able document according to embodiments of the invention.

Turning now to the creation of a mark-able document, FIG. 2 illustrates the basic steps in such a process, which may be performed in response to execution of a computer program executed by system 101. Initially, a definition file is created (201). The definition file defines the content and layout of, and provides instructions for processing user-made marks on the mark-able document. A globally unique identification (GUID) associated with the definition file is generated (202). Both the definition file and the GUID are then stored (203). Then, a two-dimensional representation of the GUID is created for inclusion on the printed mark-able document (204). After the definition file is created and the mark-able document is otherwise complete, the document is printed (205) and ready for marking.

The definition file for a particular document defines any number of mark-able items to be placed on the mark-able document depending on the particular application and related processing instructions. A mark-able item is a visual element of defined size and shape placed on a particular page of the associated mark-able document. Exemplary mark-able items are shown in FIG. 3.

Figure 3:
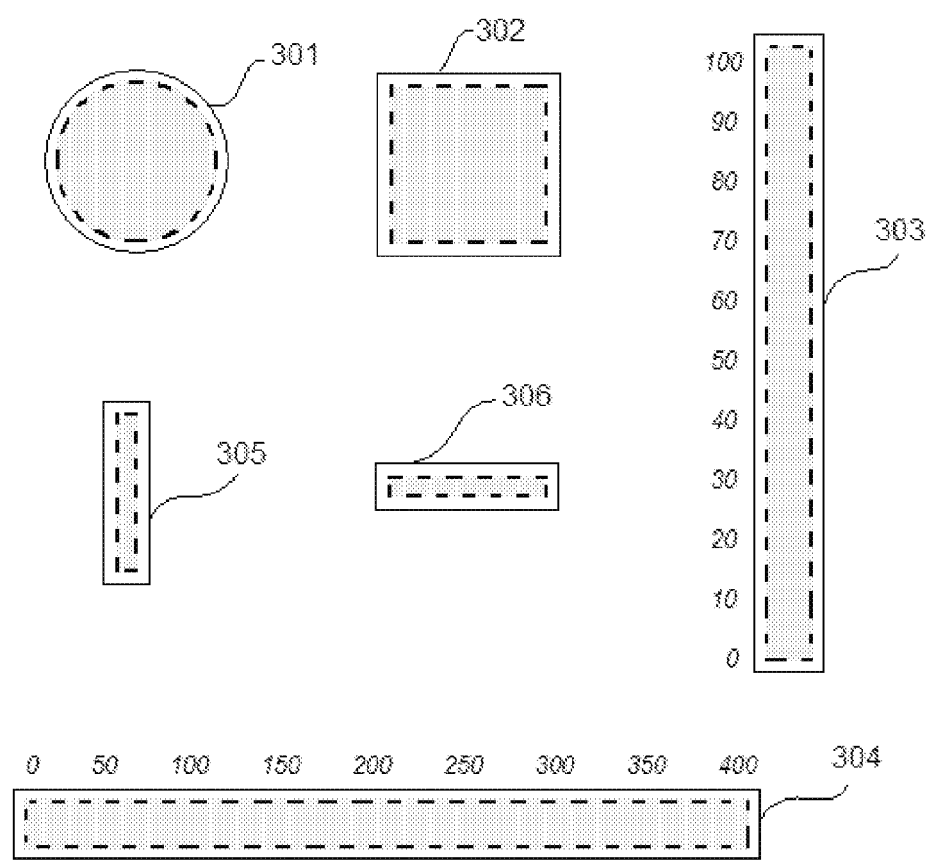
FIG. 3 shows the appearance of several mark-able item types and regions thereof that are readable during image processing, according to embodiments of the invention.

As shown in FIG. 3, one type of mark-able item is a specific shape (e.g., a circular or elliptical bubble 301 or rectangular checkbox 302). This type of mark-able item defines a mark-able area just inside the outline of the shape. Any markings that may be found outside the shape are ignored.

Another type of mark-able item has certain attributes associated with it such that a given shape may read marks based on marking positions within the mark-able, as opposed to the above-described mark-able type in which marks are read and processed without respect to their positions within the boundary of the mark-able item. For example, a vertical meter 303 and/or a horizontal meter 304 may be defined to return values based on the position of markings within the mark-able item. In the case of the vertical meter, the underlying program may be configured, such that the higher the mark in the meter, the higher the value returned. For the horizontal meter, the value may increase in either the right or left direction. Other types of mark-able items, e.g., a checkbox or bubble, may be configured to return only a single predefined value if marked. Smaller versions of vertical and horizontal meters (305 and 306 respectively) are also illustrated.

Mark-able items are not limited to the shapes shown in FIG. 3. In fact, mark-able items can also have user defined values and shapes. A user may choose to elongate a bubble or rectangle or create their own polygon mark-able item and assign any value and calculations he wishes and store this information in the definition file.

A definition file may be created in connection with an original document, with mark-able items placed by the user, or when a user adds mark-able items to an existing document copied into the system. Content in the form of mark-able items may be placed in any position on a particular page, as the user defines in the definition file. In creating the definition file, the program allows the user to see where on a particular page each mark-able item will appear to provide a WYSI-WYG (what you see is what you get) layout, which is then converted to language that the definition file can store and understand.

In addition to defining the size, shape and location of each mark-able item on a particular page, the definition file also contains instructions as to where to search for markings in relation to that mark-able item, which marks to recognize for purposes of processing, and how to process the recognized marks. Such instructions may include custom formulas and controls for the calculation thereof, as well as the output of their values. Thus, a definition file also defines the formulas and database schema that create the resulting RecordSet when the image is processed. Additional detail regarding the formulas is provided below.

The definition file may include concepts such as RecordSets in the form of columns and rows for manipulating data and performing calculations against this data. By default, a basic RecordSet structure is preferably automatically created. This basic structure may be modified by a user to suit a particular application. For example, a user can modify the RecordSet to name or label and group mark-able items. Additional detail regarding the RecordSet data structure is provided below.

Items in a mark-able document that store data in a RecordSet by row are grouped by ID. Items in a mark-able document that store data in a RecordSet by column are grouped by name. For example, each question and its associated answer choices in a multiple choice test may have six items: the question itself and five answer choices. The question represents one type of item and is embedded in one type of item, e.g., a group label, and the answer choices represent another type of item, e.g., right or wrong answers, and are embedded in another type of item, e.g., a mark-able item or bubble item. Highlighting and grouping a question and associated answers by a specific ID automatically creates a row with two columns based on the two item types selected. The group label storing the question is in one column and the bubble item storing the right and wrong answers is in the other column. In some embodiments, unless otherwise specified, the program gives this latter column the name "Results." The program is further configured such that when each subsequent question and associated answer choices is grouped by ID, the labels and bubbles are automatically set up in the correct columns, so it is not necessary to define the column name for each label. Thus, all questions and associated answer choices would then form a RecordSet having multiple rows, one for each question and its associated answer choices, and two columns, one for the group labels and the other for the results of the marked bubble. More detail regarding this aspect of the invention is presented below, along with illustrative examples.

In the context of a multiple choice test, a group label may be one of the multiple choice questions, e.g., "What is the capital of Kenya?" Associated with the question may be two or more mark-able items or bubbles, which would be embedded as grouped items. The question and associated choices are grouped by giving each the same ID, which creates a row in the RecordSet with the question text and ID value.

In more complex situations, it may be desirable to define column names by grouping columns of data across many rows giving each column a header name. A user may wish to create a mark-able golf score card in which multiple data items will be collected and processed, e.g., scores, putts, penalties, and fairways hit for each hole. Arranging each label and associated mark-able by row, will yield a label, say #1, and named "Hole." This label will be followed by multiple bubbles, say 10, to represent score, multiple bubbles, say 5, to represent putts, and additional bubbles, say 2, to represent penalties. Lastly, a check box would be included to represent whether the fairway for that hole was hit or not. Each set of bubbles and the check box can be placed in proximity to each other so that it looks to the user that each set is obviously grouped together. By naming each bubble that represents score, e.g., a stroke, the same, say with the name "Score," the program knows that the value received from this set of bubbles is to be placed in a column named "Score" in the row identified by the assigned ID. Likewise, the set of bubbles in each row that represent the number of putts would be grouped using the name "Putts." In this way, a RecordSet is created with columns for "Hole," "Score,", "Putts," etc. for each row of processed mark-ables.

The computer program with which the definition file is associated has built-in calculation functions that can be combined together or nested within each other to produce desired output. For example, the following function=SCORE( ) will automatically calculate the total score for all mark-able items on the page. To narrow the scope of the function to a subset (104, 105, 106) of the mark-able items with ids from 100-115, the following nested formula would be used=SCORE(ID (104, 105, 106)). Typically, functions such as the ones previously described are necessarily useful to properly interpret the markings from a mark-able document. Such functionality, although typically very useful, is not essential for the invention at hand. The values read from a mark-able document on image processing can be transferred to a third party application to be processed.

In sum, a definition file is produced that provides the necessary information to print out a customized mark-able document based on user input in the form of mark-able items placed on a page including text and formulas. Hence, information resulting from processing a scanned image based on a definition file can be manipulated in such a way and produce final results in such a way that it does not require further modification by any third party application. This is advantageous in a number of ways, including the fact that it is usable in a wide range of data collection situations, it is capable of deriving data, i.e., there is no need to include mark-able items to retrieve data that can be derived from other mark-able items already being requested. For example, the calculations in golf for the score for a hole and whether the green for that hole is reached in regulation is simply, strokes+putts=score and score−putts≤2, respectively. Thus, only mark-able items for "strokes" and "putts" need be added to the definition file which can derive score and greens in regulation via formulas without the need for requiring the end user to mark even more mark-able items on a page.

Additional information regarding example functions and formulas that can be included in the definition file is set forth below in the excerpt below.

\*\*\*

The definition file can not only contain the location, shape, and size of a mark-able item, but it can also store formulas that are related to a mark-able item or an output variable. In this way, when a mark-able document is processed the computer program can perform calculations based on user written formulas and display the results of said formulas.

Example functions

- Add      =Add(*value, value*);   returns the total of the two added values
- And      =And(*value, value*);   returns true if both values are positive
- Between  =Between(*value, value1, value2*);   returns true if value is between value1 and value2
- Char     =Char(*value*);   returns the character represented by the value
- Col      =Col(*value*);   creates a column name (used in the ForEach function only)
- Concat   =Concat(*string, string*);   returns the concatenated strings
- Count    =Count();   returns the number of groups
- Div      =Div(*value, value*);   returns a whole number of the divided values
- Do       =Do(*value, value*);   returns a value based on the mathmatical operators +, -, \*, /
- Equal    =Equal(*value, value*);   returns true if the values are equal
- ForEach  =ForEach(id list, do, column name);   for each of the ids in your list, perform the following do statement, put results in column name
- From     =From(*value, value1, value2*);   returns true if value is the value1 or value2 or between value1 and value2
- Get      =Get(*variable*);   returns the value stored in the variable
- Greater  =Greater(*value1, value2*);   returns true if value1 is greater than value2

- Group   =Group(*groupid*);   returns the value of the marked item within the group
- GroupItem   =GroupItem(*groupid*);   returns the index of the marked item within the group
- Id   =Id(*list of ids*);   returns a string of comma separated ids
- If   =If(*value, then, else*);   returns the value of *then* if value is true otherwise it returns the value of *else*
- Less   =Less(*value1, value2*);   returns true if value1 is less than value2
- Max   =Max(*value1, value2*);   returns the larger of the two values
- Min   =Min(*value1, value2*);   returns the smaller of the two values
- Mult   =Mult(*value, value*);   returns the total of the two multiplied values
- Newline   =Newline();   returns the carriage return string
- Nothing   =Nothing();   does nothing (used in cases where you do not want a value to be evaluated)
- Num   =Num(*value*);   converts the string value into a number
- OnUpdate   =OnUpdate(*destination label name, source column name*);   posts the value found in the Source column to the Destination label
- Or   =Or(*value, value*);   returns true if either values are positive
- Out   =Out(*variable*);   creates a variable that is displayed by the Marksheet "Output" item
- Score   =Score(*optional* id(*list of ids*));   returns the score of the values of all the marked bubbles or the score of the ids selected even if the id items are not bubbles. eg. =Score(); or =Score(id(10001-10003, 10005, 10007-10009)); respectively.
- Set   =Set(*variable, value*);   creates a variable that holds the value but is not displayed
- Sub   =Sub(*value, value*);   returns the total of the two subtracted values
- Text   =Text(*value*);   converts the value into a string
- Total   =Total();   returns the total of the values of all the marked checkboxes
- Var   =Var(*value*);   identifies a string as a variable
- Comment   = *text* ;   evaluates to nothing (used for adding comments to formula file)

Note: Formulas can contain nested functions. Functions nested within other functions are evaluated first. For example, if you wanted to get the smaller of two formulas 1. 3 x (4 + 2)

2. 20 - 3 you would write the following nested formula:

=Min(Mult(Num(3), Add(Num(4), Num(2))), Sub(Num(20), Num(3)));

First, you add the numbers 4 and 2. Then you multiply the result by 3 to get 18.
Second, you subtract 3 from 20 to get 17.
The Min function would return the number 17.
The same equation could also be written as:
=Min(Do(3*(4+2)), Do(20-3));

Getting a letter grade from a grading lookup table

```
;
= Calculate the points, then concatenate with output variable "note" ;
================================================================
====;
=set(var(points), sub(num(100), mult(sub(num(6), score()), num(7))));
=out(var(note), text(Score: ));
=concat(var(note), get(points));
=concat(var(note), text(%));
=;
=;
================================================================

;
= Looking up a letter grade from a number grade table and put in note ;
================================================================
====;
=if(from(get(points), num(96), num(100)), concat(var(note), text( A+ )), nothing());
=if(from(get(points), num(90), num(95)), concat(var(note), text( A- )), nothing());
=if(from(get(points), num(86), num(89)), concat(var(note), text( B+ )), nothing());
=if(from(get(points), num(80), num(85)), concat(var(note), text( B- )), nothing());
=if(from(get(points), num(76), num(79)), concat(var(note), text( C+ )), nothing());
=if(from(get(points), num(70), num(75)), concat(var(note), text( C- )), nothing());
=if(from(get(points), num(66), num(69)), concat(var(note), text( D+ )), nothing());
=if(from(get(points), num(61), num(65)), concat(var(note), text( D- )), nothing());
=if(less(get(points), num(61)), concat(var(note), text( F )), nothing());
=;
=;
```

If a student got 4 out of the 6 questions in a test correct, then the variable named "points" would contain his percentage score based on the formula 100 - ((6 - 4) x 7), which is 86 as calculated by the first formula above. The output variable "note" would then hold the text "Score: 86%" after executing the next three formulas. The following nine formulas are a lookup table. If the points fall within one of the ranges then the letter grade for that range is assigned. In this case, the letter grade B+ would be assigned. The Output variable "note" would contain the following text:

Score: 86% B+

\* \* \*

Figure 4:
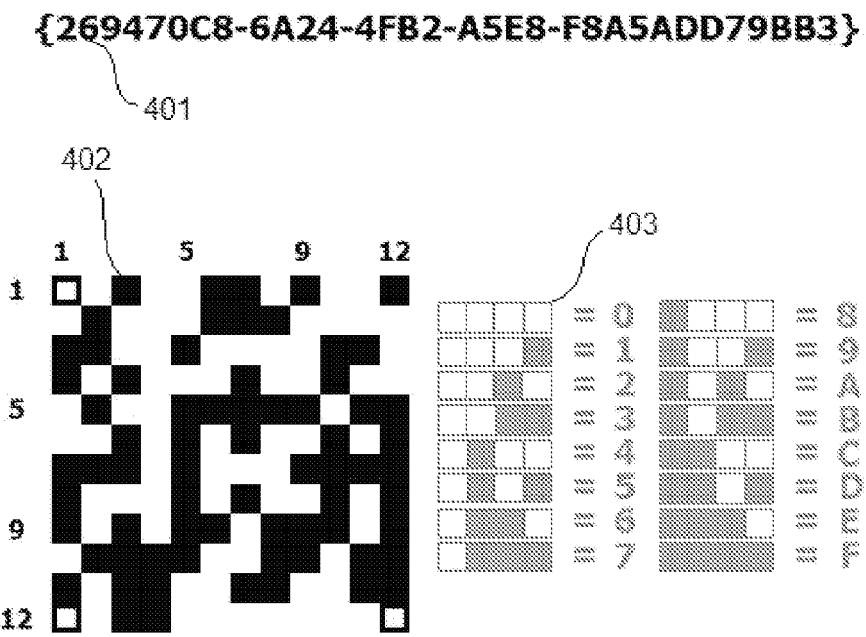
FIG. 4 shows a format of a globally unique identification (GUID), its associated two-dimensional (2-D) identification and translation of its markings according to embodiments of the invention.

Referring to FIG. 4, when the user creates a definition file, a globally unique identification (GUID) 401 is automatically generated, assigned to that definition file, and saved to that file. As previously noted, the GUID is used later for processing the marks on the mark-able document. A two-dimensional (2-D) block grid identification 402 is also created, which represents in encoded form, the GUID. In embodiments of the invention, 2-D block identification 402 is created by the computer program automatically using a code, such as code 403, following binary rules.

In accordance with embodiments of the invention, the 2-D identification mark 402 is located on the left side of the mark-able document, preferably in the upper left corner. The 2-D ID mark is configured for use in (1). quickly identifying a scanned and saved marked mark-able document as such based on the physical structure and location of the 2-D ID, (2) in detecting and correcting any skew that occurred during the scanning of the marked mark-able document before processing the user-made marks, and (3) finding, based on a reading of the value of the 2-D ID, the associated definition file that has its identification and file path stored in a registry.

These three functions are preferably automatically performed by the underlying computer program when the program recognizes the existence of the marked mark-able document(s) in a prescribed folder in a specified directory on the computer or in a specified cloud computing directory where the computer program compute access.

With the location of the 2-D ID mark embodied somewhere along the left edge of the paper, there is no requirement for orientation to be specifically built into the 2-D ID mark. The 2-D ID mark can be skewed by as much as 20 degrees and still be recognized.

The process by which the 2-D ID mark is correctly identified is by (1) finding the top left corner of the 2-D ID mark, (2) finding the top right corner of the mark, (3) adjusting the horizontal angle so that it is at about zero degrees, (4) then finding the remaining corners of the mark and confirming that distances between adjacent corners are equal, and (5) adjusting the binary block counter within the 2-D ID mark to a size that accounts for enlargement or reduction in size of the mark when the 2-D ID mark was saved as a scanned image.

At this point in processing the 2-D ID mark, the square region identified as described above is examined. Specifically, the state (on or off) of the individual blocks is determined and the ID is decoded based on code 403, in which each alphanumeric character is represented by four blocks. Scanning or other processing artifacts may introduce noise that needs to be accounted for in decoding the 2-D ID mark. This may be done by requiring, for each block being evaluated, a minimum number of "on" pixels or hits in order for the block to be identified as turned on. In one embodiment, such a minimum is set at 65% of the total pixels in the block. This naturally means that the identification number retrieved from the 2-D ID mark will rarely, if ever, match a number in the registry of definition files.

Once an identification number has been retrieved from the 2-D ID mark, this value is compared with all of the GUID values stored in appropriate registry or online. The 32 hexadecimal character string decoded from the 2-D mark is compared with the 32 character hexadecimal character strings in the registry on a location-by-location basis. In some embodiments, if 16 or more of the characters are the same, a match is declared. If more the retrieved character string matches more than one stored string based on this criterion, then the one having the most hits is used. If two or more stored strings have the same number of hits, an alert is sent to the user asking him to choose the correct file path amongst the two or more stored strings.

Once generated from the definition file, a mark-able document is printed and is then ready to be marked by a user. Markings can be made by pen or pencil on areas on the page that are visually displayed as bubbles, checkboxes, meters, pipes, or other shapes. The mark-able document may also contain instructions in the form of visuals or text, informing the user which items are mark-able and how to mark them.

Figure 5:
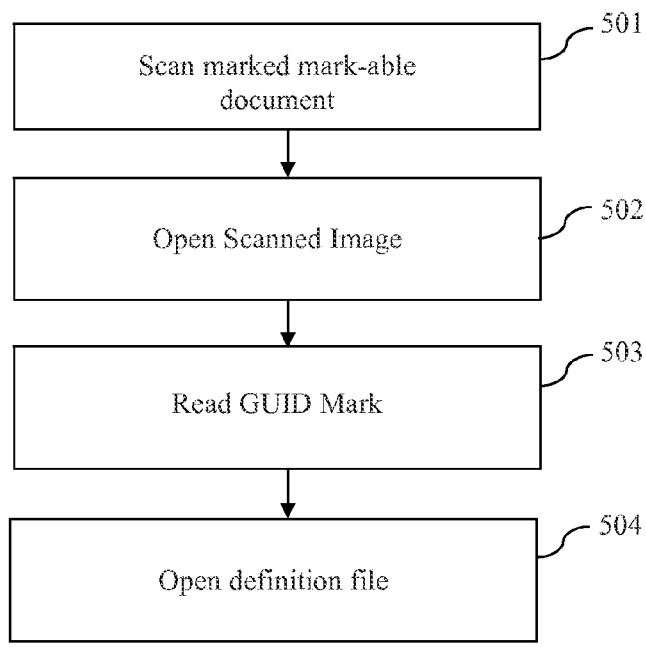
FIG. 5 is a flow chart showing steps in connection with processing a marked mark-able document in accordance with embodiments of the invention.

Once marked, the user-marked mark-able document is then processed according to embodiments of the invention. FIG. 5 provides an overview of such processing. First, the user-marked mark-able document is scanned (501), which can be accomplished by either placing the document on the flatbed of scanner 106 or feeding it, along with other documents to be processed, into the scanner's automatic feeder 107. The scanning generates a digital image file of the user-marked, mark-able document, which digital image is saved to local memory 103 and/or to cloud memory 115 based on user direction, as indicated in FIG. 1.

With continued reference to FIG. 5, the computer processing program running on system 101 then opens the scanned image (502), and reads the GUID associated with the corresponding mark-able document (503). The computer program then finds and opens the associated definition file (504).

Figure 6:
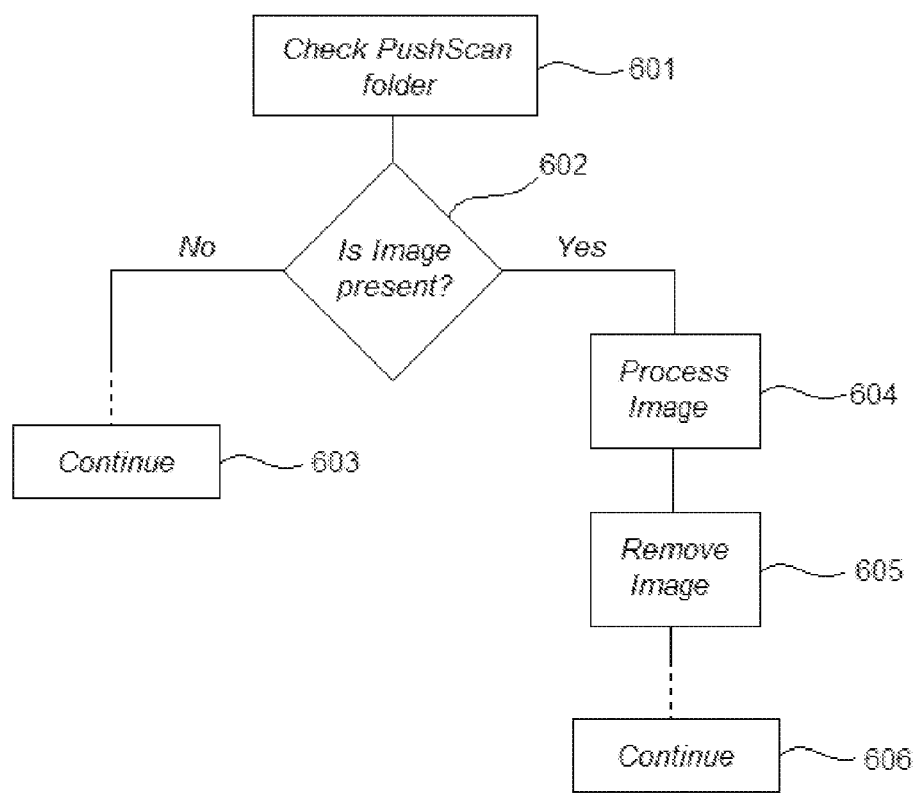
FIG. 6 is another flow chart concerning the processing of a marked mark-able document according to embodiments of the invention.

System 101 and the computer processing program may be configured to automatically process the image information upon recognition of the image and associated definition file. Such automation can be carried out using a push-scan feature, which can be coded in the processing program and enabled by an administrator. In embodiments of the invention, the push-scan feature creates a Push Scan folder in memory and directs all scanned images from the scanner to be placed in that folder. As illustrated in flow chart of FIG. 6, the computer processing program then checks this folder from time-to-time (e.g., every few seconds) for the existence of a scanned image file (601). The program determines if such an image is present (602). If not, the checking continues (603). If an image is present, it is processed according to its associated definition file (604). Then, this image is removed from the push-scan folder (605). The process then continues (606) by returning to step 601 until disabled.

Figure 7:
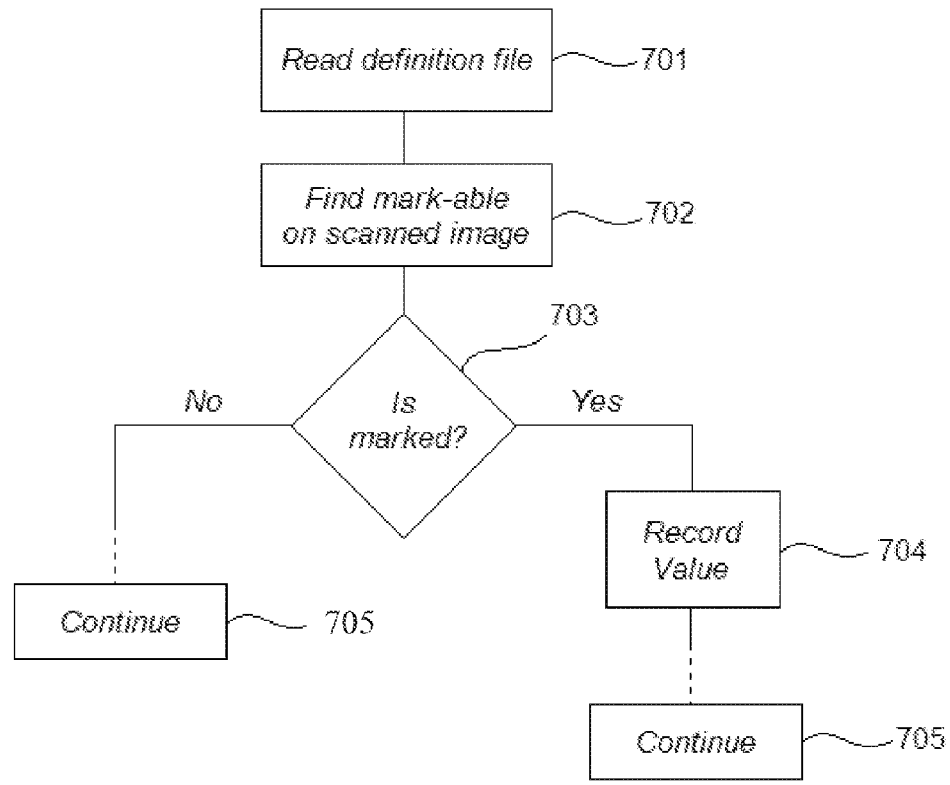
FIG. 7 is still another flow chart directed to processing of a marked mark-able document according to embodiments of the invention.

Details of the processing of the image data of the user-marked mark-able document will now be described with reference to FIG. 7. When the scanned image file and its associated definition file are read into memory, the program reads the definition file (701). Next, the scanned image file and its mark-able items are properly positioned (702). This may be accomplished by rotating the scanned image so that it is square and scaling the definition file to match the width and height of the scanned image file. The program then goes through the file and checks for marks in mark-able items (703). For each mark-able item so marked, the program locates the assigned value for that mark in the definition file and stores that value in memory (704). After processing the current mark or encountering an unmarked mark-able, the program continues to the next mark-able item (705) until each defined mark-able item has been processed.

Figure 8:
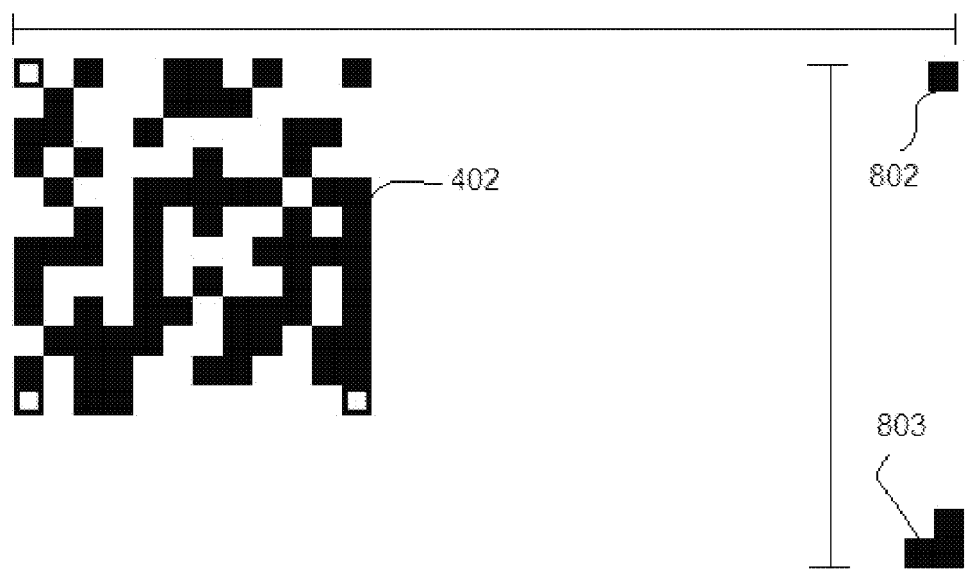
FIG. 8 is a schematic illustration showing how to detect and correct skew, misalignment, and/or scale in a scanned mark-able document according to embodiments of the invention.

The alignment processing of operation 702 is further described with reference to FIG. 8. When a marked mark-able document is scanned, it may become skewed, and may also be enlarged or reduced in size, depending on user settings or handling. Any such size alteration has the effect of reducing the accuracy of reading the user-made marks. To correct for this, marks 802 and 803 are printed in the top and bottom right corners, respectively, of the mark-able document. The bottom right corner mark 803 is used to help align and confirm the size of the image before processing the marks on the saved scanned image. Knowing what the distance between the 2-D ID mark in the top left hand corner and the bottom right corner mark should be, this distance is compared with the actual distance. If actual distance is different, the difference is used as a factor in determining the locations of the mark-able items. In the case of the saved scanned image having been reduced in size, the processing of the mark-able items will take into account the new size and adjust to it by refactoring the x and y positions of each mark-able item location on the image.

Having set forth the overall flow of creating and processing a mark-able document according to embodiments of the invention, more detail will now be provided regarding certain aspects of that flow. Examples are also provided.

Formulas

As noted above, formulas may be used in a definition file of a mark-able document or marksheet to process data in RecordSets (explained in more detail below) and to derive other values from RecordSets that can be output to a file or printed. It should be noted that, while many marksheet definition files will contain formulas, formulas are not strictly necessary for processing of the marksheet. Basic calculations such as scoring, totaling and default RecordSet file storage are built into preferred embodiments of the application software and can be formatted to end-user requirements.

Formulas in marksheet definition files advantageously allow processing of user-marked marksheets locally without the aid of third party data processing software such as spreadsheets. In this way, a systems integrator can build all the formulas needed to derive results from a processed user-marked marksheet and output this data automatically to a file or print out the results for the end user.

An administrator in a school may want to keep track of certain types of test data. To facilitate that, she can create an online database table to where all the test results will automatically be uploaded when the marksheet is scanned and processed. These tables can be made accessible to students, teachers, and parents for review. The formulas that the administrator creates and saves to the marksheet definition file are customizable and revisable both online after the file has been saved or within the original marksheet.

Figure 9:
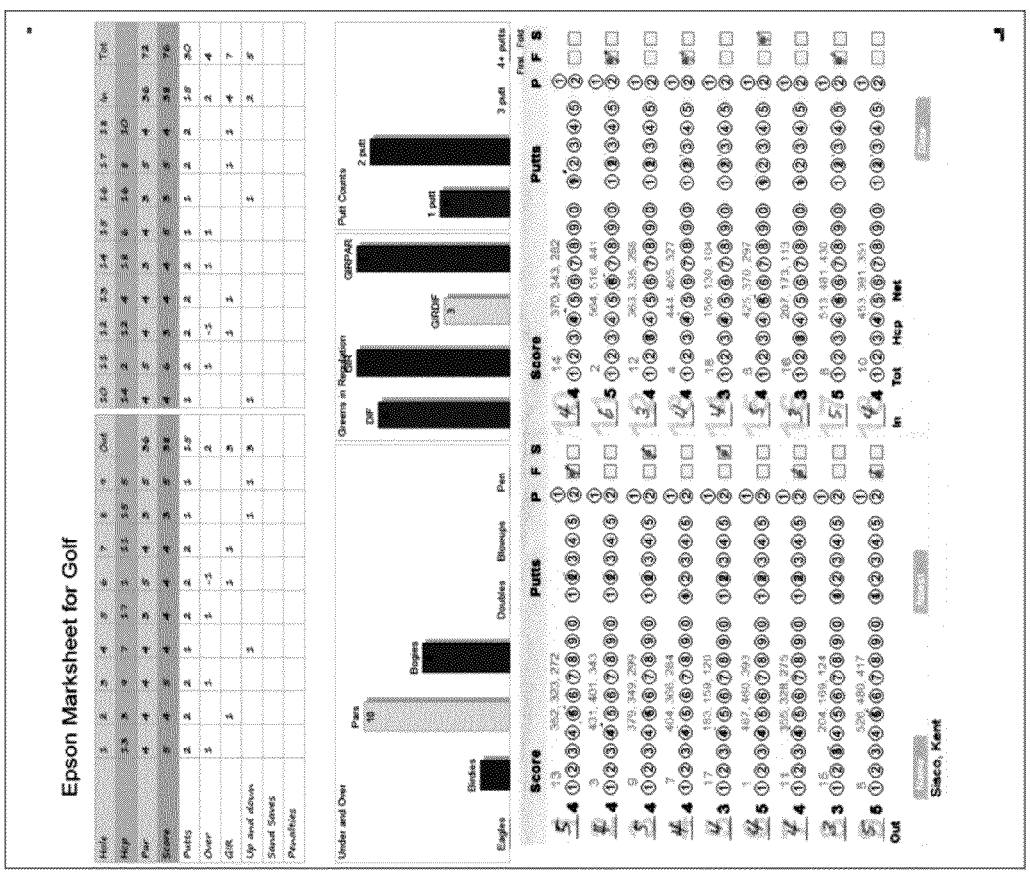
FIG. 9 shows an exemplary mark-able document (mark-sheet) in the form of a golf card, showing the user's marks and results obtained from processing such marks.

In another scenario, a golf instructor may want a student golfer to be aware of certain aspects of his game. To do so, formulas may be embedded in the definition file of the golf scoring marksheet used by the golfer. After the golfer finishes his round and scans the marked-up (scored) golf card marksheet, the formulas created by the golf instructor and embedded in the definition file automatically processes the data and derives results that are printed out for the golfer to review in the form of tables and charts. This data can also be sent to a database table in the cloud where the user can review the results online. FIG. 9 shows a user-marked golf scoring marksheet on the left and the resulting printout after the marksheet has been scanned and processed.

If the golf instructor wishes to see other data that was not derived in the first process run, the golf instructor can modify the formulas and re-run the image processing online. The next time the golfer scans another golf scoring marksheet, the updated formulas will generate new derived data either online or in the resulting marksheet printout or both.

Formulas work in conjunction with RecordSets, Tables, Charts, and Output Variables. Formulas can also be used in conditional formatting. Here is a simple example of a formula that sends text to an output variable that will be printed to the results marksheet as shown in FIG. 9:

=out(var(logo),text(Epson Marksheet for Golf));

The output variable "logo," receives the text, "Epson Marksheet for Golf." In doing it this way, the OUTPUT item only appears after the marksheet is processed and the result-containing marksheet is printed; the output variable does not appear on a clean marksheet for marking by a user. The particular set up of the above formula also enables modification to the output variable based on some condition. For example, along with the score, a message could be made to appear based on the score. For example: "You shot a 78, great!", or "You shot a 92, nice try." An exemplary formula set to carry that out is:

```
=set(var(myScore), Sum(id(1-18), col(Strokes)));
=set(var(Text1), text(You shot a ));
=concat(var(Text1), get(var(myScore)));
=if(less(get(var(myScore))), num(88)), set(var(Text2), text(, great!)),
set(var(Text2), text(,nice try.)));
=concat(var(Text1), get(var(Text2)));
=out(var(logo), get(var(Text1)));
```

The program code for creating and processing a mark-able document (sometimes referred to below as "marksheet software") includes a formula parser that interprets these formulas is as follows: Set variable "myScore" to Score the "Strokes" column from id 1 to id 18; set variable "Text 1" to the text, "You shot a"; concatenate variable "Text1" with the value in the variable "myScore"; if the score in myScore is less than 88, then set Text2 to ", great!", else set Text2 to ", nice try."; concatenate variable "Text 1" with the text stored in the variable "Text2"; output the text in "Text1" to the output variable "logo"

Figure 10:
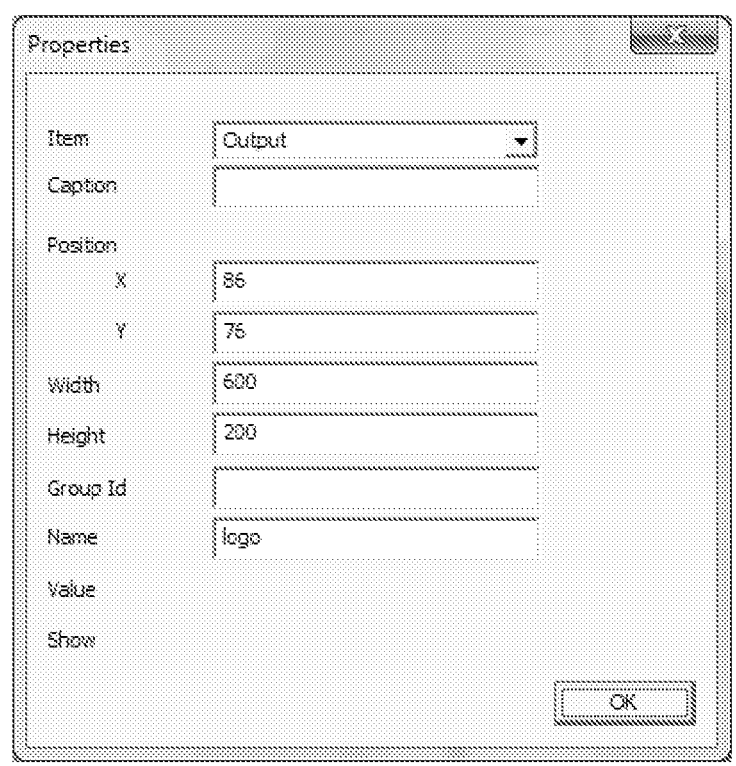
FIG. 10 shows an exemplary properties dialog box for an OUTPUT item.

An OUTPUT item with the same name "logo" would be placed on the marksheet and saved in the definition file in order for the formula to output the text in "logo" to the results marksheet. The output variable "logo" is an OUTPUT item that is placed on the marksheet and saved to the definition file. FIG. 10 show the properties dialog box for the OUTPUT item. The OUTPUT item in FIG. 10 does not need a Caption or Group Id, and hence those fields are blank. Simply set the X and Y coordinates, the Width and Height in pixels of the printable area on the page and give the OUTPUT item a name, which needs to match the name in the formula.

In a similar way, the contents of variable "Text2" could be sent to a table in the cloud (which is described in more detail below). Most data read or scraped from a marksheet and stored in a RecordSet or derived therefrom and sent to the cloud is done through formulas. This functionality is discussed in more detail below.

The formula parser is an engine built into the marksheet software. The parser has one basic data structure that holds the formula being evaluated along with results variable to hold data as the parser recursively goes through the formula. Here is a simple version of the formula data structure in the programming language C:

```
typedef struct tagFORMULA
{
    int         iForm;
    TCHAR       szFunction[MAX_LEN_NAME];
    TCHAR       szArgs[MAX_LEN_FORMULA];
    TCHAR       szResults[MAX_LEN_FORMULA];
} FORMULA;
```

The "iForm" variable holds Id of the formula which is used to jump to the right case in a switch statement. The "szFunction" holds the actual name of the formula. The "szArgs" holds the comma separated values that were sent in to the formula, and the "szResults" variable holds the results of the formula during evaluation. As will be understood by those skilled in the art, a formula can be deeply nested.

There are three basic functions that are used to evaluate a formula recursively. The order in which they are called are as follows:

1. FORMULA FormulaParser (TCHAR*szFormula, int x);
2. FORMULA ParseFormula (TCHAR*szFormula);
3. FORMULA SwitchFormula (FORMULA fnForm, int x);

The "FormulaParser" is called and this function parses out any nested formulas and sends them on to be evaluated. Each function begins by calling "FormulaParser" first to see if there are more formulas that need to be processed. Once the function determines that it has reached the end and all nested formulas have been found, it evaluates each function and passes the results on to the preceding function.

A simplified version of the code that recursively evaluates a nested formula string is as follows:

```
FORMULA FormulaParser (TCHAR *szFormula, int x)
// x is the record id
{
    FORMULA     fnForm;
    ZeroMemory (&fnForm, sizeof(FORMULA));
    if (*(szFormula+0) == ',')
    {
        if (*(szFormula+1) == ',')
        {
            wcscpy_s (fnForm.szResults, _T(","));
        }
        else
        {
            wcscpy_s (fnForm.szResults, _T(""));
        }
        wcscpy_s (fnForm.szArgs, fnForm.szResults);
        return fnForm;
    }
    fnForm = ParseFormula (szFormula);
    fnForm = SwitchFormula (fnForm, x);
    return fnForm;
}
FORMULA ParseFormula (TCHAR *szFormula)
{
    FORMULA     fnForm;
    TCHAR       *szToken;
    TCHAR       *szArgs;
    TCHAR       *szCheck;
    TCHAR       szTemp[MAX_LEN_FORMULA];
    int         i;
    int         iOpenParen;
    ZeroMemory(&fnForm, sizeof(FORMULA));
    wcscpy_s (szTemp, szFormula);
    szToken = szTemp;
    if (*(szToken+0) == '=')
        szToken++;
    szArgs = szToken;
    while (*(szArgs+0) != '(' && *(szArgs+0) != 0)
        szArgs++;
    if (*(szArgs+0) == '(')
    {
        *(szArgs+0) = 0;
        szArgs++;
        szCheck = szArgs;
        iOpenParen = 0;
        while (*(szCheck+0) != 0)
        {
            if (*(szCheck+0) == '(')
                iOpenParen++;
            if (*(szCheck+0) == ')')
                iOpenParen--;
            if (iOpenParen == -1)
                *(szCheck+0) = 0;
            szCheck++;
        }
        TrimAllBlanks (szToken);
        if (wcslen(szToken) > MAX_LEN_NAME)
            szToken = '\0';
        i = 0;
        for (i = 0; i < MAX_FORMS; i++)
        {
            if(_tcsicmp (szToken, TokenTable[i]) == 0)
                break;
        }
        if (i > MAX_FORMS - 1)
        {
            fnForm.iForm = -1;
            wcscpy_s (fnForm.szArgs, szFormula);
        }
        else
        {
            fnForm.iForm = i;
            wcscpy_s (fnForm.szFunction, szToken);
            wcscpy_s (fnForm.szArgs, szArgs);
        }
    }
    else
    {
        fnForm.iForm = -1;
        wcscpy_s (fnForm.szResults, szFormula);
        wcscpy_s (fnForm.szArgs, fnForm.szResults);
    }
    return fnForm;
}
FORMULA SwitchFormula (FORMULA fnForm, int x)
// x is the record id
{
    bool    bSafe;
    bSafe = IsStringSafe(fnForm.szFunction, NULL, MAX_LEN_NAME);
    if(!bSafe)
    {
        fnForm.szFunction[0] = '\0';
        fnForm.iForm = -1;
    }
    switch (fnForm.iForm)
    {
    case -1:
        return fnForm;
        break;
    // OTHER CASES APPEAR HERE
    case 7: // COUNT
        fnForm = ResolveCount (fnForm, x);
        break;
    // OTHER CASES APPEAR HERE
    case 28: // IF
        fnForm = ResolveIf (fnForm, x);
        break;
    // OTHER CASES APPEAR HERE
    case 35: // LESS
        fnForm = ResolveLess (fnForm, x);
        break;
    // OTHER CASES APPEAR HERE
    }
    return fnForm;
}
```

The following are code examples of resolving a function. These examples are taken from a simplified form of resolving functions: "COUNT", "IF" and "LESS" to give you a feel for how the formulas are processed and evaluated. Notice that FormulaParser is the first function to be called in each of the Resolve "COUNT", "IF", and "LESS" functions.

```
FORMULA ResolveCount (FORMULA fnForm, int x)
{
    FORMULA     fnTemp;
    TCHAR       szTemp[MAX_LEN_FORMULA];
    TCHAR       szNum[MAX_LEN_NUMBER];
    int         iNum;
    ZeroMemory (&fnTemp, sizeof(FORMULA));
    fnTemp = FormulaParser (fnForm.szArgs, x);
    wcscpy_s (szTemp, fnTemp.szResults);
    *(szTemp+(_tcslen(szTemp)+1)) = 0;
    memset (fnForm.szResults, 0, MAX_LEN_FORMULA);
    iNum = 0;
    int         iRS = 0;
    bool bFinished = false;
    while (!bFinished)
    {
        if (RecordSet[iRS].id == 0)
                    bFinished = true;
        else
        {
            iNum ++;
            iRS++;
        }
    }
    _itow_s (iNum, szNum, 10);
    wcscpy_s (fnForm.szResults, szNum);
    return fnForm;
}
FORMULA ResolveIf (FORMULA fnForm, int x)
{
    FORMULA     fnTemp;
    TCHAR       szTemp[MAX_LEN_FORMULA];
    TCHAR       *szCatch;
    bool        bCondition = false;
    ZeroMemory (&fnTemp, sizeof(FORMULA));
    // If condition is true
    fnTemp = FormulaParser (fnForm.szArgs, x);
    wcscpy_s (szTemp, fnTemp.szResults);
    *(szTemp+(_tcslen(szTemp)+1)) = 0;
    memset (fnForm.szResults, 0, MAX_LEN_FORMULA);
    wcscpy_s (fnForm.szResults, szTemp);
    if(_wtoi(szTemp) != 0) bCondition = true;
    szCatch = fnForm.szArgs;
    GoToNextArgument(szCatch);
    if (bCondition)
    {
        fnTemp = FormulaParser (szCatch, x);
    }
    else
    {
        GoToNextArgument(szCatch);
        fnTemp = FormulaParser (szCatch, x);
    }
    memset (fnForm.szResults, 0, MAX_LEN_FORMULA);
    wcscpy_s (fnForm.szResults, fnTemp.szResults);
    return fnForm;
}
FORMULA ResolveLess (FORMULA fnForm, int x)
{
    FORMULA     fnTemp;
    TCHAR       *szCatch;
    TCHAR       szValue1[MAX_LEN_FORMULA];
    TCHAR       szValue2[MAX_LEN_FORMULA];
    ZeroMemory (&fnTemp, sizeof(FORMULA));
    // This is Value1
    fnTemp = FormulaParser (fnForm.szArgs, x);
    wcscpy_s (szValue1, fnTemp.szResults);
    // Then Value2
    szCatch = fnForm.szArgs;
    GoToNextArgument(szCatch);
    fnTemp = FormulaParser (szCatch, x);
    wcscpy_s (szValue2, fnTemp.szResults);
    memset (fnForm.szResults, 0, MAX_LEN_FORMULA);
    if (_wtoi(szValue1) < _wtoi(szValue2))
        wcscpy_s (fnForm.szResults, _T("1"));
    else
        wcscpy_s (fnForm.szResults, _T("0"));
    return fnForm;
}
```

Each function has a similar interface with code unique to its processing characteristics. Numerous functions can be added to this code base to allow for required functionality in many different vertical markets.

Record Sets

The RecordSet is a data structure that consists of rows and columns of data read or scraped from the scanned image of a user-marked mark-able document or marksheet, or as the result of a formulated query accessing data in another RecordSet processed in local memory. FIG. 11 depicts the RecordSet generated from reading or "scraping" the raw data from a user-marked golf scoring marksheet.

The structure of a RecordSet is defined in the definition file associated with the user-marked marksheet. In preferred embodiments, by default a RecordSet has the following three columns of data: Id, Header, and Result. When mark-able items are placed on a marksheet and saved as a definition file, Ids and Headers are automatically assigned to that item. When the marksheet is marked up, scanned and processed, the user-marked mark-able item ids and pre-assigned values from the definition file are retrieved and stored in the RecordSet. Any additional columns of data are assigned to mark-able items spanning group ids through the use of Names. Each mark-able item in a definition can be assigned a Group Id and a Name. Group Id assignments in the definition file show up as rows of data. Name assignments in the definition file are displayed as columns of data. In FIG. 11, the column names: Tees, Yards, Hcp (Handicap), Par, Strokes (Score), Putts, Pen (Penalties), DIF (Drive in Fairway), and GSB (Green-side sand bunker) are names assigned to mark-able items defined in the definition file. The Id 700 is assigned to the group of items that refer to Tee Selection.

The raw data found in the RecordSet in FIG. 11 is scraped from the user-marked saved image as shown in FIG. 12. The label item headings shown above the mark-able items in FIG. 12: Score, Putts, P, F, S refer to the columns Strokes, Putts, Pen, DIF, and GSB respectively. The data from these columns is referred to as "marked values." The other columns, Tees, Yards, Hcp, and Par come from non-mark-able items such as LABEL items and LIST items that are assigned ids and names in the definition file and referred to as "label values." For example, the first row of data on the left side of FIG. 13 shows a printout of the LABEL item, 4 and the item, 13 and a LIST item showing 352, 323, 272. These label and list values are retrieved from the definition file and put into the columns Par, Hcp, and Yards respectively.

The LIST item values can be displayed in their entirety, or an individual item from the list can be selected and placed in the RecordSet. In the illustrated embodiment, the marksheet LIST item was pre-defined to display the first item in the list, which was defined with the name: Tees.

A more detailed look at a section of the image will show the user how the definition file is interpreting the user-marked marksheet and what results will appear in the RecordSet. FIG. 13 shows a section of FIG. 12 in detail, and FIG. 14 shows the corresponding values placed in the RecordSet.

The data values retrieved from the items Par, Hcp, and Yards are termed "label values," as they are retrieved from non-mark-able items. The remaining items: Score, Putts, P, F and S are called "marked values," because they are retrieved from mark-able items.

"Marked values" are assigned values in the definition file when it is created by a user. Any item type can have any value assigned to it when the definition file is in edit mode. For example, the value 5 as shown in FIG. 14 in the "Strokes" column was defined in the definition file as an item type BUBBLE.

Every item in FIG. 13 was assigned the Group id: 1. Every BUBBLE item in FIG. 12 in the column under the heading "Score" was given the name "Strokes." FIG. 15 shows the values set in the properties dialog box for the BUBBLE item in the 5$^{th}$ position in the first row under the "Score" column on the marksheet.

The label and marked values are types of RecordSet data and are scraped as raw data from a user-marked marksheet. Another type of RecordSet data comes from formulated queries that derive data from the raw data RecordSet through the use of formulas. Some examples are shown below.

```
=foreach(id(1-18), do(Strokes-Par>0), col(Over));
=foreach(id(1-18), do(Marked*Strokes-Par), col(Even));
=foreach(id(1-18), do(Strokes-Par=1), col(Bogey));
=foreach(id(1-18), do(Strokes-Par=2), col(Double));
=foreach(id(1-18), do(Strokes-Par=3), col(Triple));
=foreach(id(1-18), do(Strokes-Par>3), col(Blowup));
=foreach(id(1-18), do(Strokes-Par=0), col(Pars));
=foreach(id(1-18), do(Par-Strokes=1), col(Birdies));
=foreach(id(1-18), do(Par-Strokes=2), col(Eagles));
=foreach(id(1-18), do(Putts=1), col(1Putt));
=foreach(id(1-18), do(Putts=2), col(2Putts));
```

FIG. 16 shows a RecordSet with this type of data as the calculated results using the above user defined formulas. The "foreach" function allows the user to query the default RecordSet and derive data using user defined formulas over the specified ids. As an example, how the processing software interprets the formula: foreach(id(1-18), do(Strokes−Par>0), col(Over). For each id that falls in the range 1-18 do the following calculation: (Strokes−Par>0) and place the results in a column named "Over." The calculation simply returns a value indicative of either true (represented by 1) or false (represented by 0). When the value is 1, it is placed at the appropriate location in the "Over" column. When the value is 0, nothing appears.

RecordSets can be queried to return single values as well. For example, the following formulas would return the total number of birdies achieved, stored in a variable in the RecordSet and output to a page:

```
=foreach(id(1-18), do(Par-Strokes=1), col(Birdies));
=set(var(myScore), sum(id(1-18), col(Birdies)));
=out(var(myBirdies), get(var(myScore)));
```

The column names in the RecordSet can be any names that the end user chooses to describe the results that will appear in that column. The ids that are used can be any grouping that the end-user chooses, as well. For example, the end-user may want to find the results of the ids 1-9 only or every even numbered id (2,4,6,8 . . . ).

In preferred embodiments, a RecordSet can be referred to during the scanning process or after the process is complete by referencing the values from a stored file. Once the process is complete, the RecordSet memory is dumped to a CSV file and saved for access by future processes.

For purposes of illustration, consider a RecordSet that has the following simplified structure:

```
typedef struct tagRECORDSET
{
    int            id;
    int            item;
    int            type;
    TCHAR          szLabel[MAX_PATH];
    TCHAR          szValue[MAX_STRING];
    TCHAR          result[MAX_STRING];
    int            value[MAX_COLUMNS];
}RECORDSET;
```

The "id" variable holds the group id. The "item" variable holds the index in the item array. The "type" variable holds the type of item we are dealing with such as: BUBBLE, CHECKBOX, LABEL, OUTPUT, etc. The "szLabel" variable holds the variable name given the item, if any. This is a unique name that is used as the variable in a RecordSet. In the previous example a variable was created using the SET formula and called it, "myScore." As is shown again below:

```
=set(var(myScore), sum(id(1-18), col(Birdies)));
=out(var(myBirdies), get(var(myScore)));
```

This name is stored as a label in the RecordSet and is automatically assigned an id in the RecordSet array. The output variable "myBirdies" is also placed in the RecordSet and is associated with the OUTPUT item given the name "myBirdies." This name is stored as a Label in the RecordSet and is automatically assigned an id in the RecordSet array. The output variable, "myBirdies" is also placed in the RecordSet and is associated with the OUTPUT item given the name "myBirdies." "szValue" and "result" variables hold any text variables and number variables, respectively. The "value" array variable holds all the values that have been scraped from a user-marked marksheet that are of the same group id as this item and it includes all the values that are derived from this item.

It should be noted that the RecordSet structure described above is simply conceptually illustrative. The actual application can store a much broader variety of data types.

Essentially, a RecordSet is a row of data. When declared as an array, it becomes a multiple row RecordSet as shown in the following declaration:

RECORDSET RecordSet[MAX_ITEMS];

Scraped data from a user-marked marksheet are set in the RecordSet row through the use of functions. Some simple examples of functions that "set" column names and "get" data from the RecordSet array are as follows:

```
int SetRecordSetColumnName(TCHAR *szName, int nCols)
{
    int        i = 0;
    bool       bFound = false;
    if(_wcsicmp(szName, _T("Results"))==0)
    {
        return −1;
    }
    while (i < nCols && !bFound)
    {
        if(_wcsicmp(szName, RecordSetColumns[i].szName) == 0)
        {
            bFound = true;
        }
        else i++;
    }
    if (!bFound)
    {
```

-continued

```
            wcscpy_s(RecordSetColumns[i].szName, szName);
            nCustomColumns++;
            i++;
        }
        return i;
}
```

The above "SetRecordSetColumnName" function makes sure a column is not duplicated. If it is not found in the RecordSet column list then it is added to the RecordSetColumns array.

The following code snippet returns the processed results of a variable that was defined using the SET or OUT function as shown in the following formulas:

```
        =set(var(myScore), sum(id(1-18), col(Birdies)));
        =out(var(myBirdies), get(var(myScore)));
int GetRecordSetNumericResult(TCHAR *szVariableName)
{
    int         i = 0;
    int         iReturn = 0;
    bool        bFound = false;
    i = 0;
    while (!bFound && i < MAX_ROWS)
    {
        if (_wcsicmp(szVariableName, RecordSet[i].szLabel) == 0)
        {
            bFound = true;
            iReturn = _wtoi(RecordSet[i].result);
        }
        else i++;
    }
    return iReturn;
}
```

RecordSet data can be sent directly to a table in the Cloud and saved with a unique table id and client id so that the data can be accessed by anyone who has been given permission by the marksheet user. The Cloud is described in more detail below.

Table Items

FIG. 17 shows an example of a TABLE item that contains printed results of a marked up and processed Golf Scorecard marksheet. The TABLE item is simply a group of horizontal and vertical lines that form a grid that can be used to organize data into columns and rows similar to the columns and rows found in a spreadsheet.

To understand the TABLE item and how it can be used to display content from a scanned marksheet, a general understanding of mark-able items such as the BUBBLE item is helpful. Marksheet items such as the BUBBLE item or CHECKBOX item or other custom mark-able items are for defining regions on a sheet of paper that can be marked by a user, scanned and saved as a digital image to the computer, where the marks are "lifted" from the page and then interpreted by the marksheet software as rows and columns of data. Rows and columns of data can only be interpreted by the marksheet software when mark-able items are grouped. Grouped items by default have a "Label" column and a "Results" column. For example, grouped BUBBLE items can be further broken down into separate columns of data by giving Names to certain bubbles within the group of BUBBLE items as depicted in FIG. 18. When items are grouped, the Group should be given an Id. In this case, the group id is 1. It should be noted that each BUBBLE item is also given a value that when identified as marked will be interpreted as that value.

In FIG. 18 all the bubbles are grouped together as indicated by the line and dots on the line. This can be done by highlighting the bubbles with your mouse and selecting "Group items." To give names to bubbles within the group, highlight the number of bubbles you want to give a name to and select "Name items" and give it a name. In this example, the bubbles with the dark boxes, have been given the name "Score," and the bubbles with the lighter boxes, the name "Putts."

FIG. 19 shows a scanned and saved image of one hole of a user-marked golf scorecard marksheet indicating that the golfer shot a score of 5 with 1 putt for the hole. The grouping and names defined as in FIG. 18 are saved in the marksheet file which is known as a definition file letting the marksheet software know where the mark-able items are on the image and how to interpret the markings in FIG. 19.

When the marksheet image is processed, the marksheet software opens the definition file associated with the image and identifies all the mark-able items in the image and interprets them as Hits for the defined group and named items as in FIG. 20. If the marksheet software determines that a region has been marked then the marksheet software counts it as a Hit and draws a dot on the region to indicate a Hit.

The data retrieved from the interpretation is placed in a RecordSet in memory as shown in FIG. 21. The term "interpretation" refers to the software's ability to identify a mark-able item as being a "Hit." If the mark is identified as a "Hit" then the software gets the value and the group name and the id that was set in the definition file for that mark-able at that position. The group name is used as the default heading name in a RecordSet column. The id is the default row number. Together the id and group name become the address of the data in the RecordSet and can be retrieved or referred to and used in Tables and in other calculations.

The Group Id number "1" is retrieved from the definition file along with the headings: Id, Score, Putts. The value 5 was assigned to the bubble that was marked for Score and the value 1 was assigned to the bubble that was marked for Putts.

Figures 22, 23:
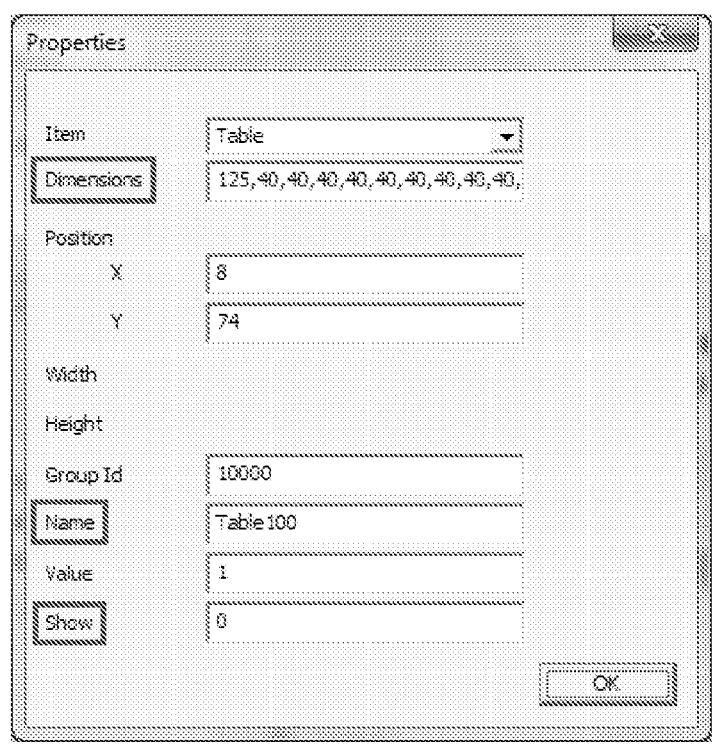
FIG. 22 shows a Table populated with values retrieved from a RecordSet.
FIG. 23 shows the settings in a properties dialog box for the Table of FIG. 22.

The values retrieved from the definition file at the preset locations are stored in a RecordSet in memory and then can be output to a Table as indicated by the outlined fields in FIG. 22.

The following explains how to create a TABLE item setting its column width and row height dimensions, table variable name, and its "Show" layer. Font formatting, background colors and how to put the data in the table in the right order will also be described.

A TABLE item can either be made visible for printing out a marksheet for markup or be made visible only when printing out the results of a marksheet. This distinction can be made by setting the "Show" value in FIGS. 23 to 0 (results only) or 1 (on marksheet). In this example, that value is set to 0, which means the table will not be printed when the marksheet for the purpose of markup is printed out. This TABLE item example will only be printed when the results of the marksheet are processed.

The three main settings are "Dimensions," Name," and "Show," as indicated on FIG. 23. "Dimensions" are set by defining the width for each column and then the height for each row. Width values are separated by commas, and a "/" separates the last width value from the first height value, with the height values also being separated by commas. The actual values used to set the grid dimensions of FIG. 17 are 125,40, 40,40,40,40,40,40,40,40,50/25,25,25,25,25.

The "Name" setting is the variable that is used to hold the data (data retrieved from the scanned and processed marksheet) and will populate the table. The contents of the "Name" variable should match the structure of the table in terms of column widths and number of columns.

Data is added to a TABLE item through the use of the Name variable referenced by formulas as shown in the Integrated Design Environment Formula View (explained in more detail below). In this example, the variable name "Table 100" has been assigned in the properties dialog box. The data that populates this variable is created and assigned in the Formula View. The following is how to write the formula to populate the variable "Table100" with data that is to be displayed as the header for the table.

```
=out(var(Table100),text(0:0/Hole,1,2,3,4,5,6,7,8,9,
    Out);
```

The formula above will generate the following results in a table grid like that shown in FIG. 22 (without the text and numbers). The formula is read as follows: output the contents of the variable "Table100" with the following text starting at column 0, row 0. Enter the text "Hole" in column 0, row 0. Then enter the text "1" in column 1, row 0. The text "2" goes in column 2, row 0, and so on. Typically, and in the illustrated example, the column and row numbering begins with "0," although this need not be case. The information preceding the "/" contains the starting column and row for the contents following the forward slash and it can also contain the background color of the top row, which is white by default. If one wants the data to start in the first column but in the second row, 0:1 would be used instead. To explicitly specify a background color, the RGB values are included in the formula. For example, to specify a yellow background, the following formula could be used:

```
=out(var(Table100),text(0:0:255,242,0/Hole,1,2,3,4,5,
    6,7,8,9,Out);
```

Row color can also be manipulated by programming. For example, a formula could be written to populate the color of a row based on the mark-able group "Hit" value. In this way, conditional formatting of the document can be created based on user marks on the paper.

To set the font for the table simply highlight the table and select a font and size and color from the typical font dialog box.

Adding the next couple of rows of marksheet printed data to the table can be done using the following formulas:

```
=set(var(myData), text(0:0:255,242,0/Hole,1,2,3,4,5,6,7,8,9,Out));
=concat(var(myData), text(|0:1:255,194,14/Hcp,));
=concat(var(myData), list(id(1-9), col(hcp)));
=concat(var(myData), text(|0:2:222,222,222/Par,));
=concat(var(myData), list(id(1-9), col(par)));
=concat(var(myData), text(,, ));
=concat(var(myData), sum(id(1-9), col(par)));
=out(var(Table100), get(var(myData)));
```

Instead of directly outputting data to the variable "Table100", a variable can be created in the IDE Formula View named "myData." The strings could have been directly concatenated to "Table 100" if desired.

In the first line of code, the function SET is used to create the myData variable and put the contents of the text into that variable. The second line of code concatenates a pipe symbol (|), which is interpreted as starting a new row. The following lines concatenate more information and data to the myData variable before the data is output to the table. The last line of code puts the contents of the myData variable into the item with the name Table100. In this case, the item is a TABLE item. Note that the variable item could have been set to a LABEL item, in which case, the output would simply be the text output at the location where the label was defined. The output function is given a variable name associated with a marksheet item, e.g., =out(var(Table100),get(var(myData)));. The code above would generate the first three rows of data in FIG. 17.

Finally, the user marked data is accessed to generate the last two rows of data in FIG. 17. The following code snippet shows this:

```
=concat(var(myData), text(|0:3:160,200,238/Score,));
=concat(var(myData), list(id(1-9), col(strokes)));
=concat(var(myData), text(,, ));
=concat(var(myData), sum(id(1-9), col(strokes)));
=concat(var(myData), text(|0:4/Putts,));
=concat(var(myData), list(id(1-9), col(putts)));
```

The data that appears in the first three rows is called "label values," which is data that is actually printed on the marksheet before the end-user marks up the marksheet. The data that appears in the last two rows is called, "marked values," which is retrieved from the pre-defined mark-able items that were identified as hits on the marksheet when the marksheet is processed.

Templates

Templates are essentially a specialized version of definition files that are created using Epson marksheet IDE software. The IDE (integrated design environment) is described in more detail below. A template can contain any number of mark-able items, text, objects, images, formulas, input forms, cloud database table transactions and formats. Templates can be stored and accessed locally or online by the IDE application and a marksheet reader.

Figure 24:
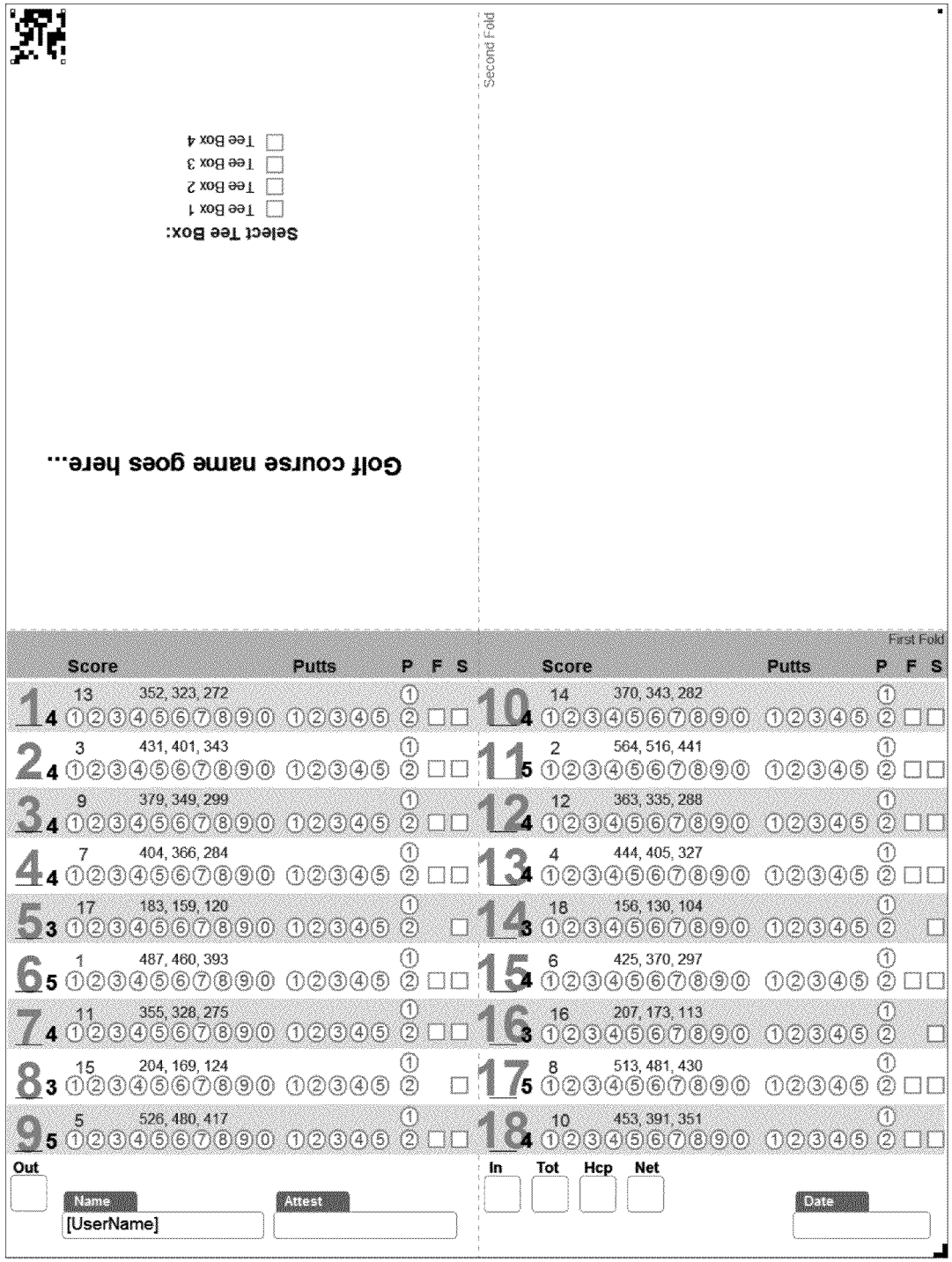
FIG. 24 shows an exemplary template in the form of a golf card marksheet.

In one basic scenario, a template is created by the systems integrator that will be accessed by users in their domain. Users open the template and interact with it using input forms to modify the content of the template and save the file and print it out for mark up. An example of a template is shown in FIG. 24 in the form of a marksheet golf scorecard.

The marksheet designer or systems integrator can place mark-able items anywhere on a page using the IDE. The items are grouped together and named to form a RecordSet, which may be referenced by formulas to derive data and output to the printer or to a file or to an online database table. Web pages can then access the data and display the data in an appropriate format.

A golf course marksheet is a very good example case for the use of templates. While every golf course has different data such as distances and difficulty, any golf scorecard typically has a place to record the scores for 18 holes of golf. The layout of the scorecard as may its data content, but all have a place to record scores for 18 holes of golf. Golf scorecards may also provide space to record other types of information beyond just the hole-by-hole score, such as how many putts and penalties were taken on a particular hole, whether the drive on particular hole landed in the fairway, and/or whether the golfer's ball landed in a green-side bunker on a particular hole.

It is up to the template designer as to what information should be tracked on a marksheet template. The template designer or (systems integrator) will also be responsible for how the data is processed and where it is stored. The user of the template does not need to know how the template was made; nevertheless, the user will be able to interact with it in a way that will allow the user to modify the content of the template very easily through the use of input forms.

Figures 25, 26:
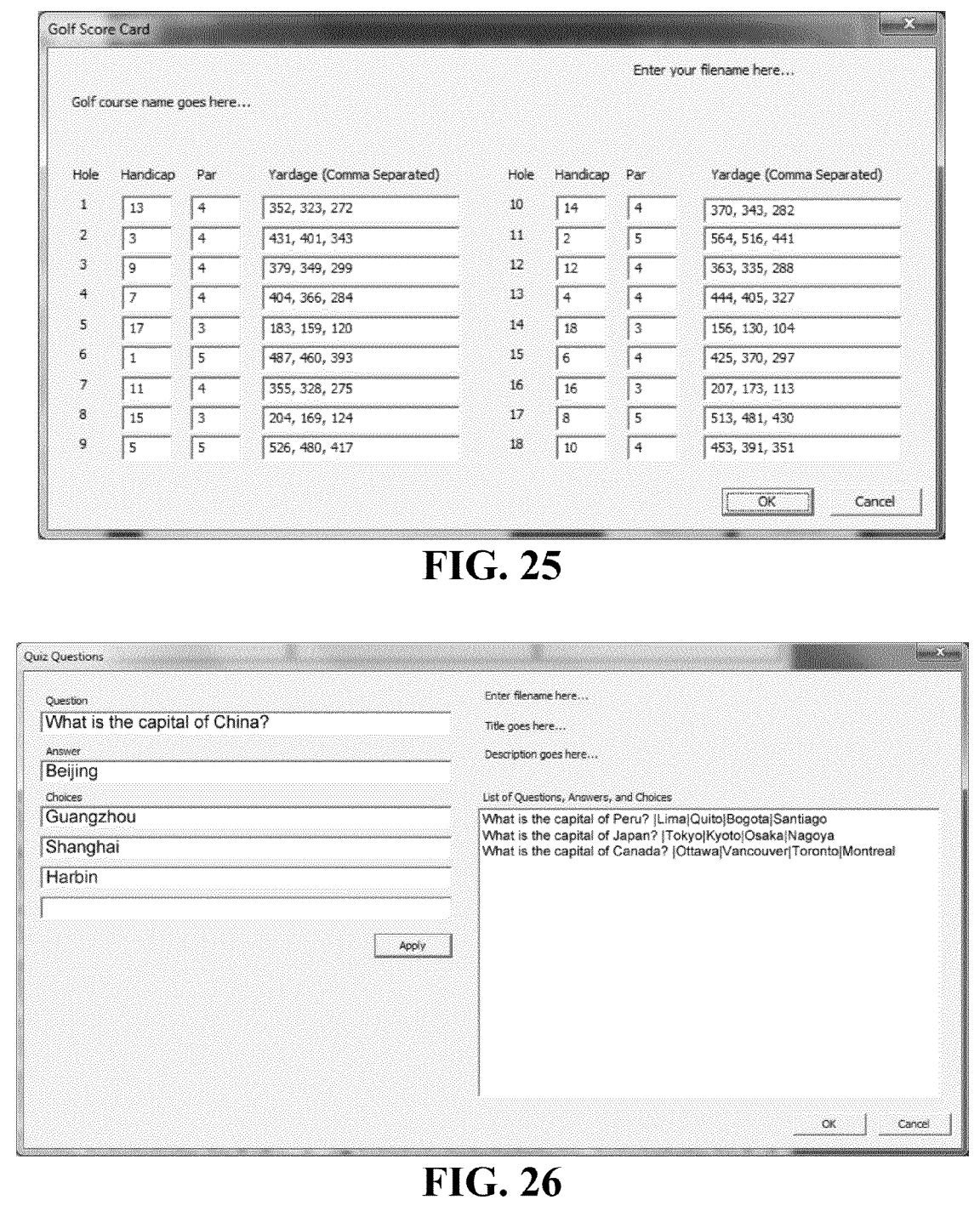

For example, let's say a systems integrator has created several marksheet golf scorecard templates from which a user can choose the layout or scoring that best fits his or her needs. The user opens the marksheet and is presented with an input form that allows the user to change the par and handicap for each hole along with the yardage and other pertinent information. FIG. 25 shows an input form that will modify the content of a marksheet golf scorecard template.

The input form is created using a tool built in to the IDE. The input form edit controls are automatically associated with group labels and other modifiable items and placed on a dialog box that can be further organized and formatted by the systems integrator in a way that will make sense for an end-user. Once the input form has been designed and saved, it can be added and saved to the marksheet template so that when the template is opened, the user can modify the contents. When the definition file is saved as a template file, the end user will be able to safely change any data on the marksheet without breaking any other components or functionality within the template.

User data can also be added to a marksheet template when printed out. This may be desirable in, for example, a golf tournament. The marksheet golf scorecard template could be modified to match the course tournament data. Processing could then include a ranking of the tournament players based on overall score or other criterion.

A list of golfers playing in the golf tournament can be saved to a text file and associated with the template. When a scorecard is printed out, the marksheet reader application will create a golfer specific GUID and draw it on the printed marksheet golf scorecard. It will save this GUID with a golfer last and first name in the list and other data and also associate this GUID with the original template GUID.

When the golfer marks up the golf scorecard marksheet and scans the file, the processing engine reads the GUID on the scanned marksheet image and finds the associated golfer, golfer data, and template file and uploads the data to the cloud database tables with all the golfer specific data. An example of how this may be done is described below.

CLOUD items are added to the marksheet to send client, user, and table ids to the cloud. A Record id is returned and then the actual data is sent to the cloud with the record id as shown below. The first CLOUD item named CloudRecord is: User_Records (ClientId, UserId, TableId)@RecordId. The other CLOUD item named CloudRound is:

```
User_Golf_Rounds (_RecordId, _CourseId, _EventId, _Division,
_TypeName, _LastName, _FirstName, _Tees, _Hole01, _Hole02,
_Hole03, _Hole04, _Hole05, _Hole06, _Hole07, _Hole08, _Hole09,
_Out, _Hole10, _Hole11, _Hole12, _Hole13, _Hole14, _Hole15,
_Hole16, _Hole17, _Hole18, _In, _Total, _Hcp)
```

These CLOUD items are explained in more detail below.

Next, formulas are written to populate the CLOUD item calls with the data from the processed marksheet and from the associated user files. The formulas can be auto-created, and the systems integrator can make any changes as necessary. Below are example formula scripts written to populate the CLOUD item calls above.

```
==CLOUD=RECORD===================================;
=set(var(myData), text('^',0,300));
=out(var(CloudRecord), get(var(myData)));
==CLOUD=ROUND====================================;
=set(var(myData), text('?',2,'*','@','Score','>','<',));
=concat(var(myData), list(id(700), col(Tees)));
```

```
-continued
=concat(var(myData), text(,, ));
=concat(var(myData), list(id(1-9), col(Strokes)));
=concat(var(myData), text(,, ));
=concat(var(myData), sum(id(1-9), col(Strokes)));
=concat(var(myData), text(,, ));
=concat(var(myData), list(id(10-18), col(Strokes)));
=concat(var(myData), text(,, ));
=concat(var(myData), sum(id(10-18), col(Strokes)));
=concat(var(myData), text(,, ));
=concat(var(myData), sum(id(1-18), col(Strokes)));
=concat(var(myData), text(,, ));
=concat(var(myData), text('!' ));
=out(var(CloudRound), get(var(myData)));
```

The first formulas in both CLOUD RECORD and CLOUD ROUND above contain symbols that are replaced with real user data. Here is the replacement key for the following symbols:

'^' = client id retrieved from the registry file (registry.emr)
'?' = record id returned from the first CLOUD item call
'>' = last name returned from the members file (members.emm)
'<' = first name returned from the members file (members.emm)
'!' = first value in the registry file (registry.emr)
'@' = second value in the registry file (registry.emr)
'#' = third value in the registry file (registry.emr)
'*' = event id from the registry file (registry.emr)

It should be noted that the marksheet application looks at templates as they relate to an event. In preferred embodiments, all templates are assigned an event id when printed.

A marksheet is associated with an event, e.g., a marksheet for a school quiz or a golf tournament, both of which are events. An event also has people participating in the event such as students for the quiz or golfers at the golf tournament. Those participants may be thought of as members or users who are associated with the event and associated marksheet. Each member may have other unique data that could be associated with him or her. For example, a student may have an associated class room number or time period data. A golfer may have handicap, division, flight, and other data. This information is stored in the registry associated with the member. The following are the files and the contents that are used to manage a template:

EVENT.EME
    Event Id (GUID)
    Event Name
    Member list (file path)
    Output data to CSV, CLOUD, and/or PRINTER
MEMBER.EMM
    Member Id (GUID)
    Last name
    First name
REGISTRY.EMR
    Marksheet Id (GUID)
    Event Id (GUID)
    Member Id (GUID)
    Other Event/Member related data (comma separated)

A template may also be created for a quiz. The quiz template can have a number of questions, and for each question, a set of choices from which to choose. One quiz may have 20 questions with 4 multiple choices per question, while another quiz might have 12 questions with 5 choices each. The template can create and reshape the layout of the quiz marksheet based on the content put into the template. FIG. 26 shows an example dialog box of a template input form for a quiz.

In some embodiments, the quiz template contains one label and a single bubble. Each of the LABEL item and the BUBBLE items may be formatted. to color and font specifications. When the Questions, Answer, and Choices are entered, they automatically create new LABEL items and BUBBLE items with those format settings. The end user can also modify the color and fonts used if they choose using a marksheet reader, which is a limited version of the IDE. The marksheet reader can only modify some features of a marksheet, such as color and font, but cannot make any changes to the formulas or cloud connection items.

The template software also has the ability to randomize the choices for a given question, for each unique member (e.g., student) marksheet. With such feature implemented, every printed quiz marksheet will have the same questions and choices, but the latter will be presented in a different order for each student. When the marksheet is scanned, it finds the definition file that will be used to score the marksheet and then finds the order in which the answers are laid out on the page. This is illustrated with FIGS. 27A and 27B, which present the same choices for each question but in different orders.

Figure 27A:
FIGS. 27A and 27B show quiz marksheets derived from the same template and question file, but with the order of the question choices changed.
Figure 27B:

The output of FIGS. 27A and 27B are both derived from the same template and the same question file, but the order of the choices has been changed and a unique GUID mark has been applied. The [UserName] field would have a student's name applied when the marksheet is printed out. The unique GUID mark would be associated with a student and the template being used.

The questions themselves can be reordered amongst the marksheets. Another feature is the ability to add more possible choices to a question and have the marksheet select which choices to show for a particular marksheet. In that case, while each student's marksheet would contain the same questions (possibly in a different order than each of the other students) and the same correct answer for each question, the alternatives (wrong answers) for a given question may vary from marksheet to marksheet. Obviously, this may raise questions as to the fairness of the quiz but that would be something for the instructor to address.

Integrated Design Environment (IDE)

Figure 28:
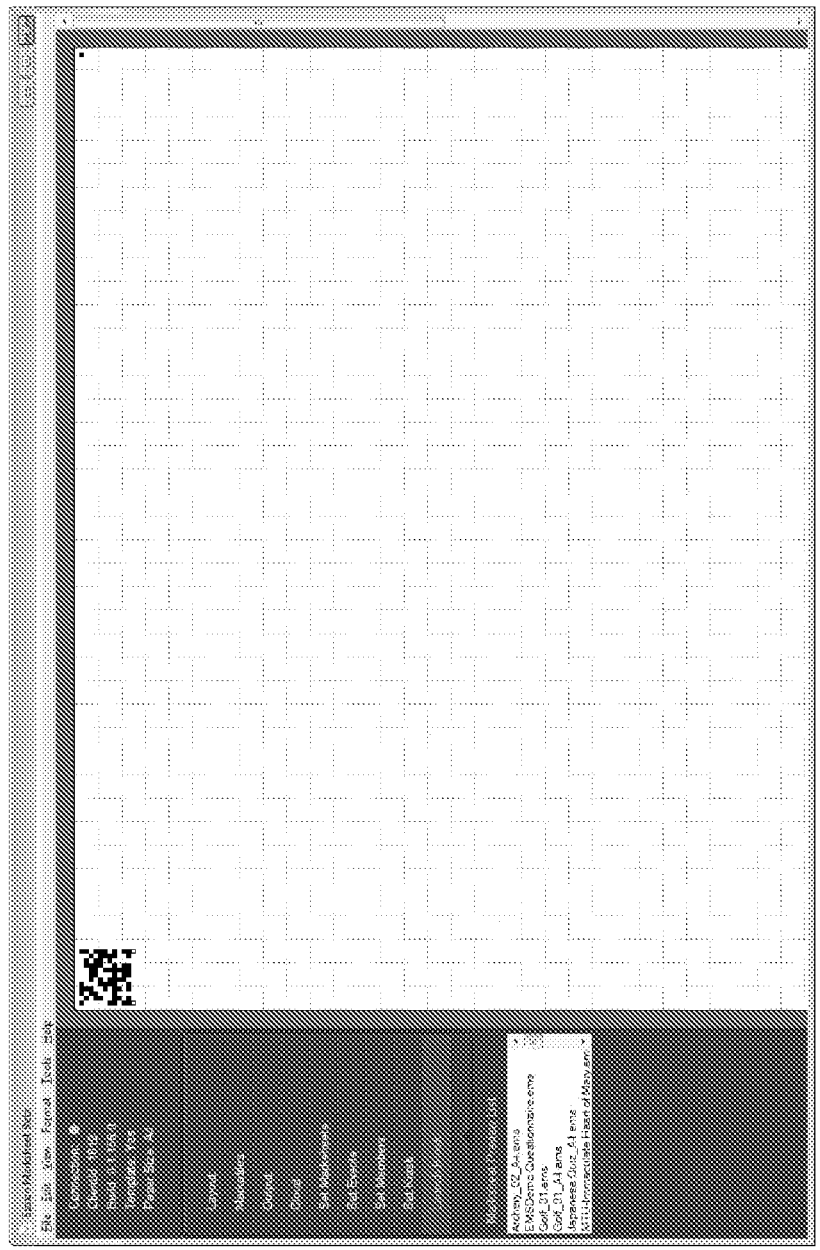
FIG. 28 shows a screen shot of an Integrated Design Environment (IDE) software application for marksheets.

The IDE is the software application that provides a comprehensive set of tools to systems integrators and users for creating, testing, debugging, processing, and managing marksheet files and data. The IDE, of which a screen shot is shown in FIG. 28, includes: a graphical marksheet designer, a marksheet formula editor, an interpreter (formula/image processor), a viewer (scanned/processed images, marksheet templates, recordsets, cloud tables), automation tools (deploy cloud tables/accounts), a templates/accounts manager, a browser-less web portal, and a debugger. The IDE is designed to increase productivity by providing tightly-knit components specifically for creating and working with marksheets and processed marksheet data. The IDE is dedicated to Epson file and data structures and associated scripting language. The IDE enables the systems integrator to easily create marksheet templates and deploy templates to their account users on premise and online. This includes the ability to process, interpret, store, and categorize user marksheets and also to incorporate any processed marksheet data into their existing systems. The IDE also manages user accounts in administrator mode and allows end-users to download and install a marksheet reader applet.

The user interface provides online and local access to preview marksheet templates from a marksheet collaborative community online, edit template and custom formulas, scripts, macros, browse marksheet data, view scanned marksheet images, process marksheets, and view table and recordset data all within the IDE application itself. A third party browser, e.g., Internet Explorer or Firefox, is not needed to access any of the online marksheet data. Results of a processed marksheet can also be printed out using the IDE and reader.

When the IDE interface is launched, it automatically initiates a connection with the online client account. If successful, the IDE will have access to all public templates and user accounts along with all previously uploaded client processed marksheet data. Uploaded data is also stored locally for offline usage. If the IDE cannot connect to the online client account, it continues to works offline until an online connection is re-established.

Data that is captured from a scanned and processed marksheet is automatically uploaded to the online client database tables if the marksheet template includes cloud storage functionality and a connection to the cloud account is established. If the marksheet has cloud storage functionality built in, but a connection to the cloud cannot be made, the data is stored locally and flagged as data to be uploaded to an online account. When an online connection is restored, the data is automatically uploaded to the online database tables.

The interface to the IDE can be run entirely online or as a thin client app on a local computer. The built-in IDE tools reside locally and online in a cloud computing platform. The end user does not need to install the application locally. The tools can be accessed through the user's online account. The application communicates with and acts as a messaging agent between the cloud computing and storage functionality and the printing/scanning device.

Figure 29:
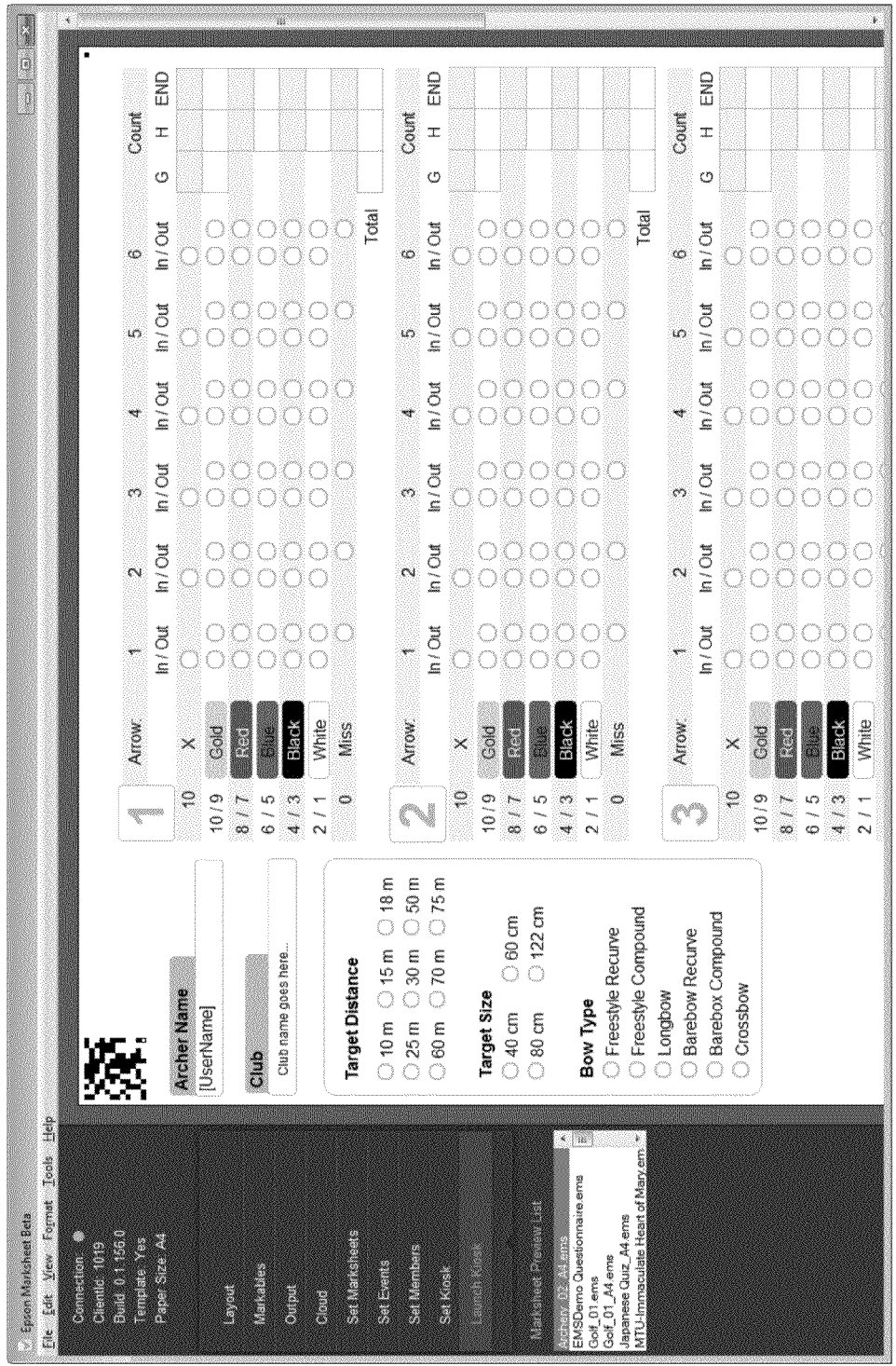
FIG. 29 depicts an exemplary interface of the IDE with a marksheet template in preview mode.

FIG. 29 depicts the basic interface of the IDE with a custom marksheet template in preview mode. The particular custom marksheet is an archery marksheet.

Figure 30:
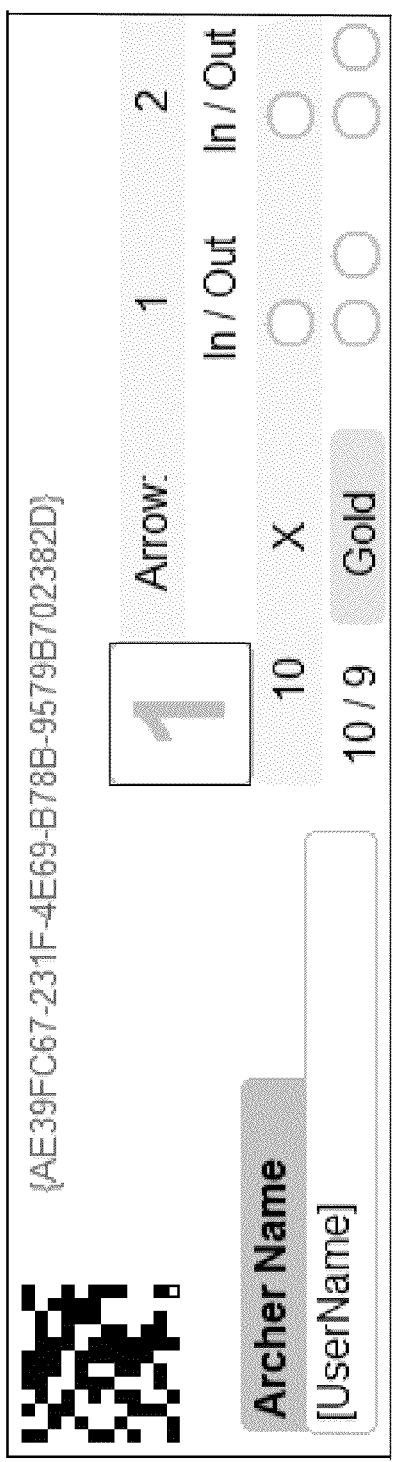
FIG. 30 shows a portion of FIG. 29.

In this version of the IDE, the left panel contains a list box that is populated with marksheet templates that reside both locally and in the user's account online. The user can preview the templates before using them. The preview mode also allows the IDE to view and process images outside of the kiosk. This allows the creator of the template a way to debug the template. The IDE allows the user to view the actual value of the GUID (or thumb print) of the marksheet on the page and confirm the value when testing. FIG. 30, which shows the top left portion of the marksheet of FIG. 29, shows the GUID mark more clearly and also shows the GUID value next to the GUID mark.

The IDE also has the ability via color coding or other means to show the user how accurately the GUID is being read. The user can adjust the settings for reading the GUID. These settings include the size, location, and granularity. This function also allows the end-user the ability to place more than one GUID on the page and redirect associated mark-able content results to other tables.

Figure 31:
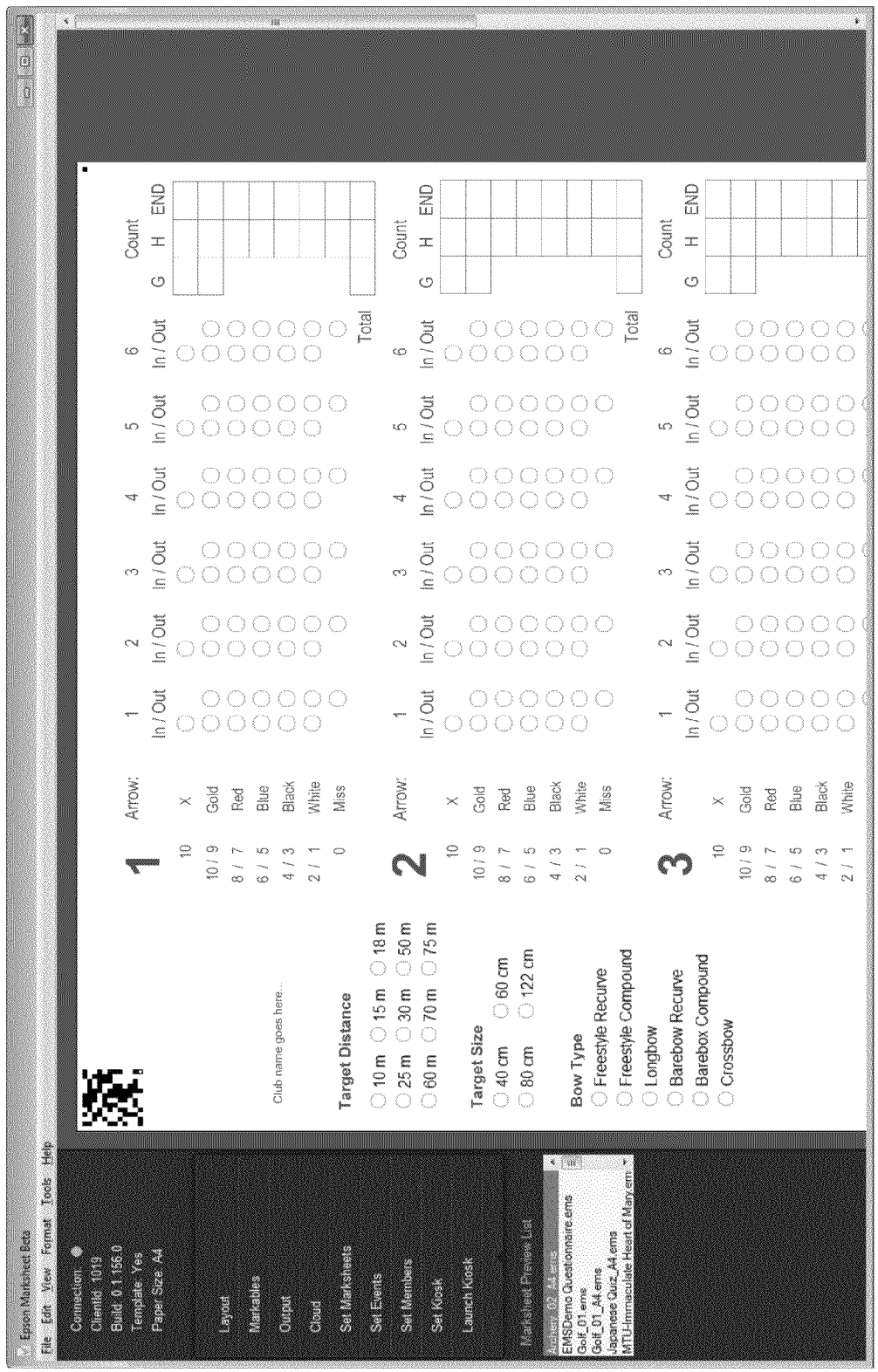
FIG. 31 shows one layer of content of a marksheet document, with other layers suppressed.

Marksheet content can be viewed in layers to make it easier to view different portions of the extensive marksheet content, which includes mark-able items, output items, images, text, cloud interfaces, and other items. Layer functionality allows the designer to look at just the items they are working on, while minimizing the presence of other items. FIG. 31 shows the content for mark-able items and their associated labels. The other items on the page are suppressed.

Figure 32:
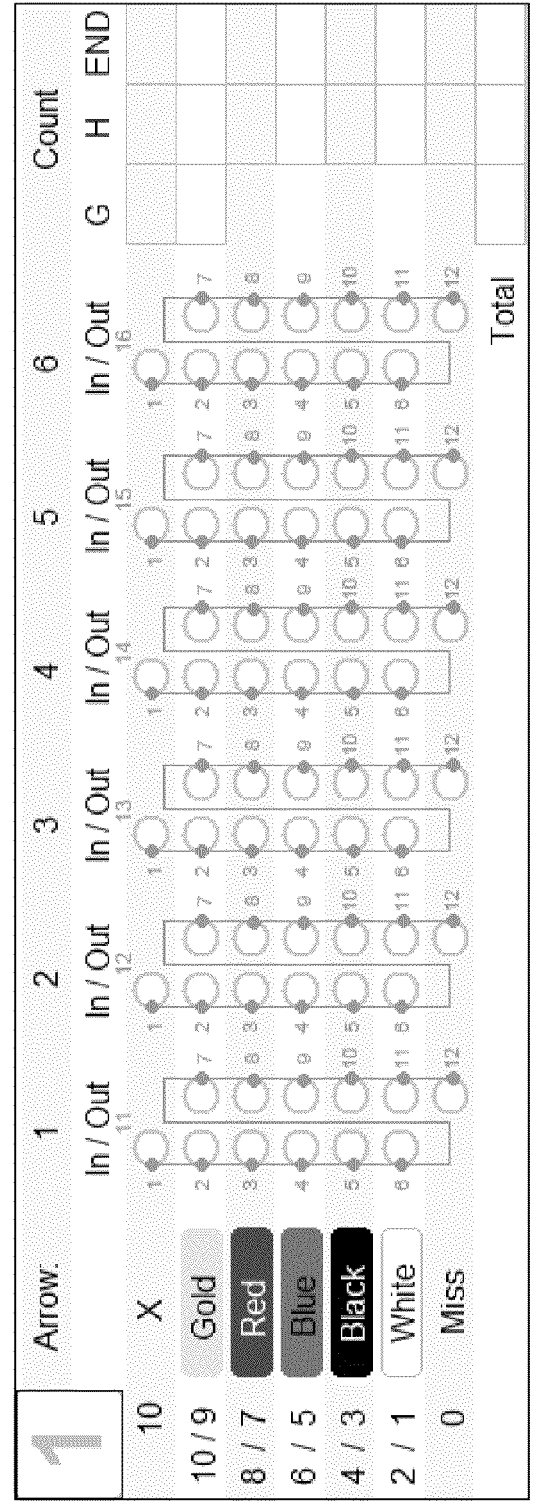
FIGS. 32 and 33 show groupings and answers and the values assigned.
Figure 33:
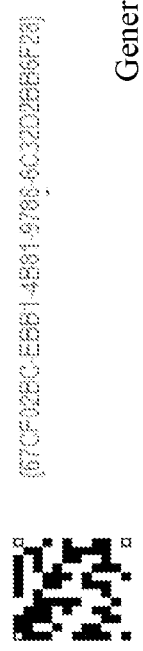
Figure 33:
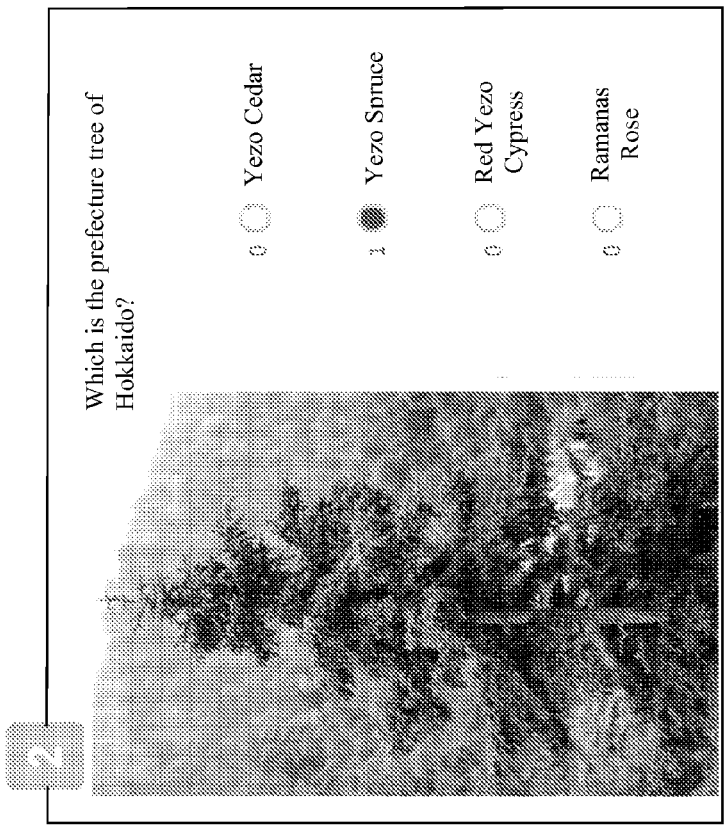
Figure 33:
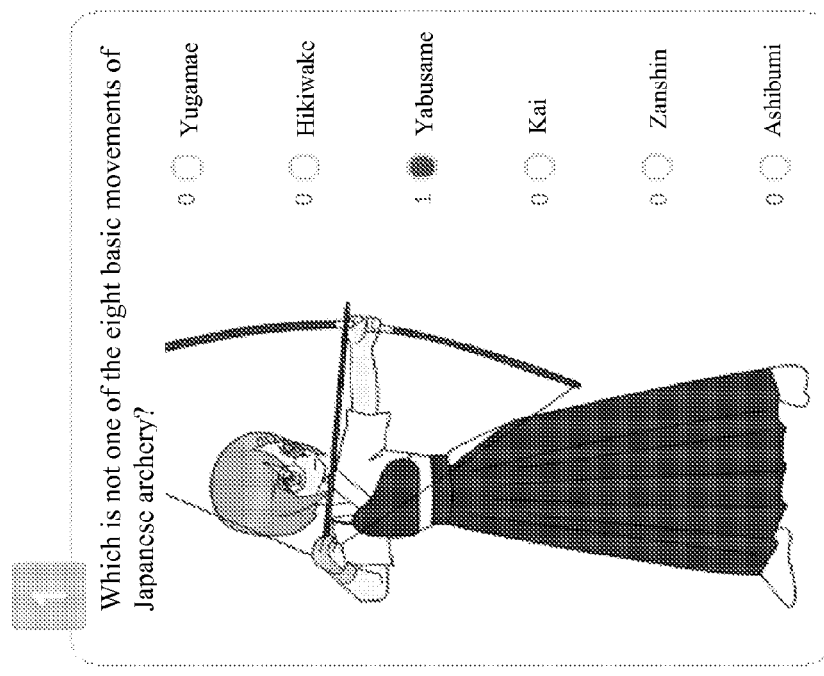

Layer functionality can also show how the items are grouped, their values, granularity settings for reading markings in a mark-able item and other property settings. FIGS. 32 and 33 show groupings and answers and the values assigned.

When a marksheet in preview mode, the IDE can switch to layout/designer mode. The user can change the layout of the marksheet and can also edit any supporting formulas, scripts, or macros. The IDE allows the user to create marksheet templates from scratch and to import functionality from other templates as well.

Formulas are generally used to calculate and derive values when a scanned marksheet image is processed. Scripts are for running big batches of varied marksheets for the ability to organize the storage of scanned marksheet images, when results are to be made visible to end users, and any conditional alerts the administrator wishes to be displayed. Macros are defined routines that are run when results from a processed marksheet meet a specified condition.

Any compatible marksheet template can be modified using the IDE, including formulas, scripts, and macros. The interface has a document viewing area that doubles as the document editing area. This viewing area can also be toggled between (1) a formula, script, macro editor, (2) a cloud data viewer, (3) a scanned image viewer and image processor, and (4) a file viewer.

In some embodiments, marksheet formulas are stored in the marksheet file and interpreted using an Epson parser in the Marksheet IDE and reader applications. Formulas can be deeply nested and the calculated and derived results can be sent to output items within the marksheet or to a database table in the cloud.

The IDE has standard file open functionality. File/open is selected to view scanned images and marksheets in the IDE. The IDE allows the creator of the marksheet to open individual scanned images and process them individually and watch how the IDE is interpreting the marks and to see if the results are being stored correctly. This includes the viewing of how accurately the marks were identified. Adjustments to the marksheet can be made to ensure that markings in a mark-able item are indeed user marks as opposed to unintentional markings or smudges.

The results of a scanned and processed marksheet can be viewed in a RecordSet or in a cloud table.

Epson marksheet templates are originally created using the marksheet IDE application and are "re-useable" marksheets. Such a template marksheet can be opened, customized by the marksheet reader and saved under a different filename. Such marksheet templates include mark-able items, text, images, formulas, scripts, macros, cloud connections, output items, and may include additional items, Custom marksheets can be created from scratch or modified from existing marksheet templates using the marksheet IDE. When a user creates a marksheet template using the marksheet IDE, the background scripts, macros, and formulas are automatically generated. The user can view these entries and modify or add any formulas or macros as needed. Mark-able items, such as bubbles and checkboxes, can be any size. The user can also create custom mark-able shapes. Mark-able items can also be nested. For example, concentric bubbles can be created to form a target-like mark-able. For example, each of five concentric bubbles may have an additive value of 1, so that the center bubble if marked would generate the value 5.

Figure 34:
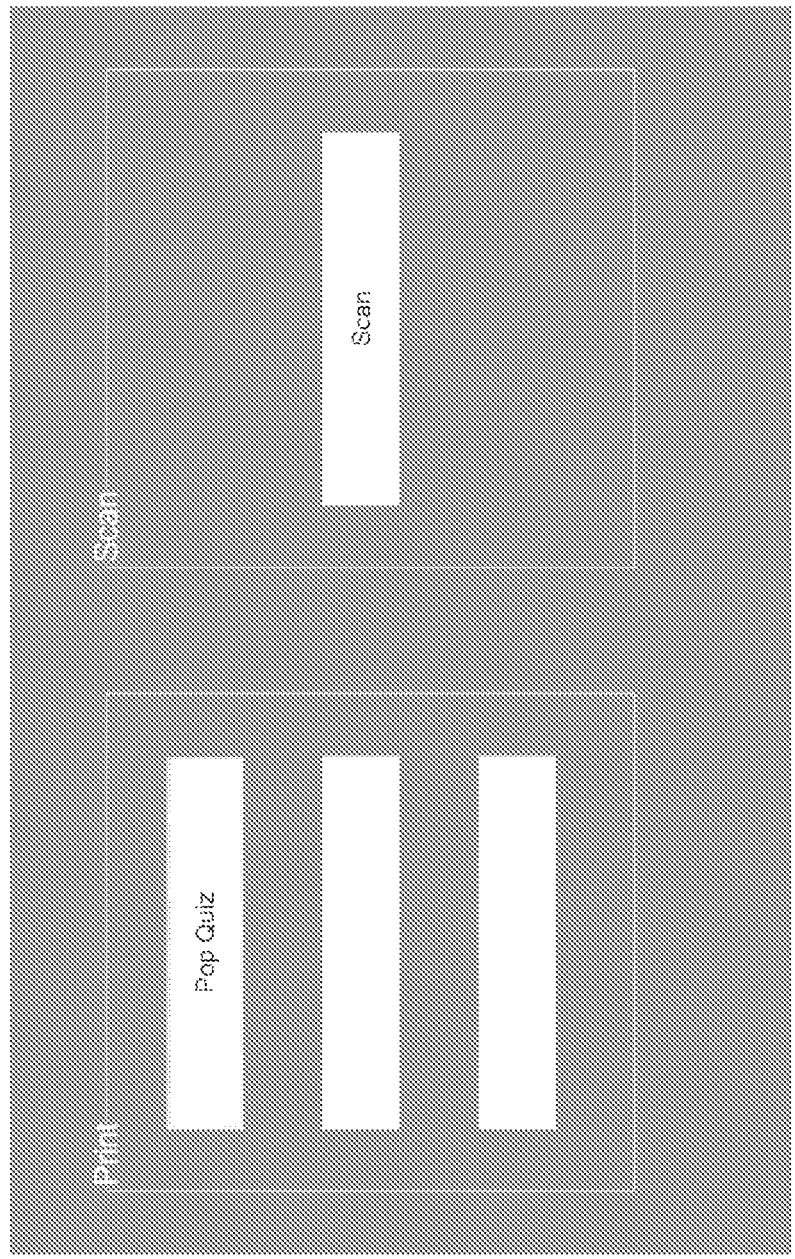
FIGS. 34 and 35 show screen shots of the IDE in kiosk mode.
Figure 35:
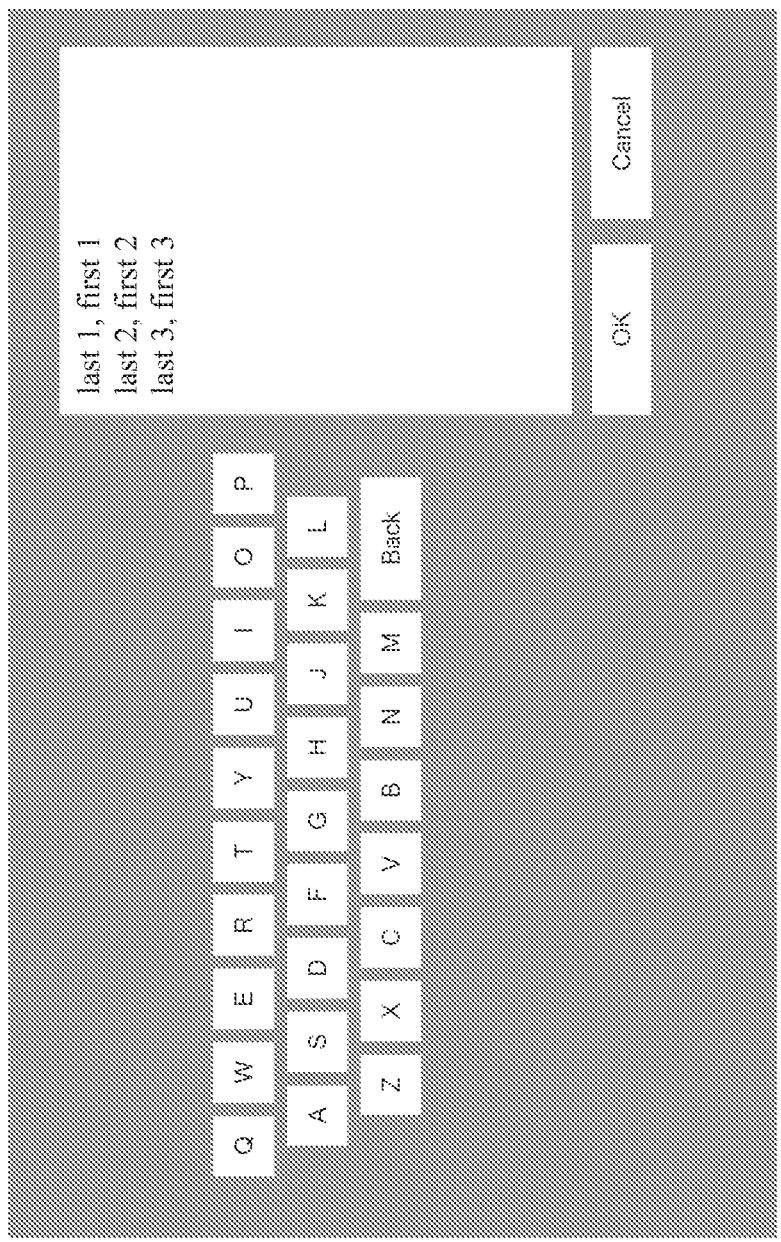

There is also a "kiosk" mode, as illustrated in FIG. 34. Such mode is specifically made for use in a touch screen environment. A keyboard is not used. The user sets up a touch screen in Kiosk mode and attaches the screen to the printer via an operating system that has the printer drivers installed. Buttons, captions, macros, etc. are assigned by the user. End users of the marksheet use the kiosk to print out marksheets and then to scan the marksheets for processing. The kiosk simplifies the process to: print, mark, and scan (and process). FIG. 35 shows the next screen after selecting the Pop Quiz button depicted in FIG. 34. The names of test takers would appear in the space on the right of the screen in FIG. 35.

The process for setting up the kiosk can be done in both the IDE and reader version of the marksheet application. Background colors, buttons, or links and general layout of the kiosk are customizable by the user to meet the user's requirements.

Cloud Computing Environment

The cloud computing environment, as used herein, refers to either (1) the processing of mark-able documents or marksheets using an appropriate marksheet software application running in an application platform at an Internet-accessible location, or (2) the uploading of locally processed data to online database tables. In the first scenario, the general steps are: printing a marksheet from online or local storage, marking it up, scanning and saving the image to an online accounts (e.g., "scans") folder, processing the image using the online marksheet software application, and storing the data in online tables. In the second scenario, the first two steps are the same, and in the third step the saving is done to local storage. The image is then processed locally, and the data uploaded to online tables. In either scenario, the data should only be accessible online via system confirmation of proper login credentials.

The image processing functionality is run in the cloud. The same image processing function used in processing scanned marksheet images in local memory is uploaded to an online platform and run online. The online image processing capability allows any suitable local operating system to have access to the image processing and data table features without having to run operating system specific marksheet software locally. A local operating system, such as that used on Windows or Mac platforms, simply needs to be in operable communication with a scanning device that will save scanned marksheet images to local storage. The user can then upload the scanned marksheet images to his/her online account "scans" folder via a web form.

When a marksheet image is saved to the online "scans" folder, the processing function receives a message from the online queue letting the function know that an "image for processing" is in the "scans" folder. The function processes the image and stores the data in online tables and moves the image out of the "scans" folder and transfers it to the "processed" folder. If image processing fails, the image is moved out of the scans folder and into a temporary "pending" folder and the end user is alerted.

Figures 36, 37:
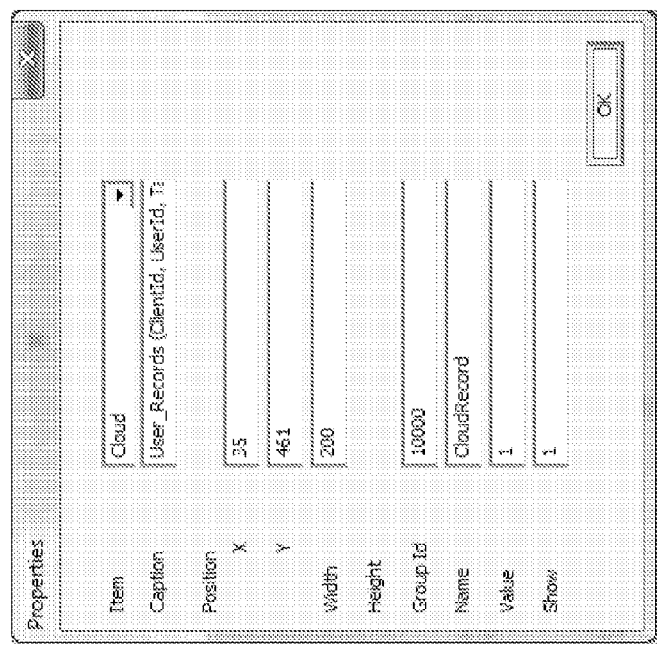
FIG. 36 shows an example of a cloud database table.
FIG. 37 shows an exemplary properties dialog box for a CLOUD item and its settings.

Cloud database tables, which essentially are pre-defined database tables residing online, store data retrieved during image processing. The data stored in the database tables includes account ID and other IDs necessary to uniquely tag the data. With proper credentials a user can access the data through his/her online account. FIG. 36 is an example of a user record data table. Cloud database tables are organized in such a way and holds view IDs that allow a web link URL to access the data and have it displayed to the end user in the proper format. The URL looks up the account ID and event ID in a cloud database table, identifies the type of data and re-directs the URL to a page that can display the data in the correct format. The end user can also export the data to a common format such as CSV or XML.

With proper credentials an administrator account can create cloud database tables to store data online that is processed from custom marksheets. Custom cloud database tables can be created through a web form in the administrators account online. The web form can contain fields, the following of which are typical: table name, field name, field data type, and field data size. Other fields may be provided as well. A marksheet template can populate the custom database table(s) through the use of a CLOUD item type, which is read when the scanned marksheet image is processed. The CLOUD item type is saved in the marksheet template definition file. FIG. 37 shows the properties dialog box for a CLOUD item, along with particular settings. The CLOUD item can be placed anywhere on the page. The X and Y position and the width of the text output can be any size and does not affect the CLOUD item connection with the online table.

The two most important fields in the CLOUD item properties dialog box are "Caption" and "Name." The Caption field holds the actual CLOUD item function call. The Name field holds the variable that will receive the data from the processed marksheet. In this case, the variable has been assigned the name, "CloudRecord." The "CloudRecord" variable is populated by formula, of which the follow is an example:

```
=set(var(myData), text(1002,0,300));
=out(var(CloudRecord), get(var(myData)));
```

The formula is read as, Set the variable "myData" with the text string, "1002,0,300". Put the myData string in the "CloudRecord" variable and output it to the item with the name "CloudRecord." The reason for using formulas to populate the CloudRecord variable is to allow the marksheet processing code to be able to concatenate variable data to the CLOUD item caption. In this way, a single CLOUD item can insert many different values to the cloud database tables.

When the CLOUD item is processed, the actual SQL statement looks something like this:

```
INSERT INTO User_Records (ClientId, UserId, TableId, RetrievalCode)
    VALUES ('1002', '0', '300',
        '{1D640AF6-9ADB-434A-80D9-0882149D60A3}')
```

The "RetrievalCode" is auto generated by the software application and appended to the statement so that the newly created User_Records Id can be retrieved. When a scanned user-marked marksheet image is processed, the processing software first finds the supporting marksheet definition file. The definition file is found by reading the printed GUID mark on the user-marked marksheet scanned image (preferably, in the top left corner thereof). Once that has been found, the processing software scrapes the data from the image and sends it to the cloud database tables via the CLOUD item(s).

The following is an example of a CLOUD item that retrieves a record id from the user record and uses that id for storing the user's golf score card data in the cloud database tables: User_Records (ClientId, UserId, TableId)@RecordId. The "@RecordID" statement produces the following SQL statement:

```
SELECT RecordId FROM User_Records
    WHERE RetrievalCode=
        '{1D640AF6-9ADB-434A-80D9-0882149D60A3}'
```

The User_Records table stores client IDs, individual user IDs, and table IDs. The call to the CLOUD item returns an ID with the name RecordId. The data stored by this CLOUD item is inserted into the table shown in FIG. 36.

Another exemplary CLOUD item that stores golf score card data has the follow statement form:

```
User_Golf_Rounds (_RecordId, _CourseId, _EventId, _Division,
_TypeName, _LastName, _FirstName, _Tees, _Hole01, _Hole02,
_Hole03, _Hole04, _Hole05, _Hole06, _Hole07, _Hole08, _Hole09,
_Out, _Hole10, _Hole11, _Hole12, _Hole13, _Hole14, _Hole15,
_Hole16, _Hole17, _Hole18, _In, _Total, _Hcp)
```

This CLOUD item includes the RecordId from the first CLOUD item call in its set of parameters. The RecordId in this case is what allows a query to join the two tables together. The data stored by this CLOUD item is inserted into the table shown in FIG. 38.

While the invention has been described in conjunction with various embodiments, including numerous examples, it is to be understood that the invention is not so limited. Further alternatives, modifications and variations will be apparent to those skilled in the art in light of the foregoing description. Thus, the invention described herein is intended to embrace all such alternatives, modifications, and variations as may fall within the spirit and scope of the appended claims.

What is claimed is:

1. A method for creating a mark-able document, comprising:
    creating a definition file defining the content and layout of, and instructions for processing user-made-marks on, the mark-able document;
    automatically generating a globally unique identification (GUID) upon creation of the definition file, the GUID being associated with the definition file;
    storing the definition file and the GUID;
    creating a two-dimensional identification representative of the GUID, the two-dimensional identification containing a plurality of blocks, each of which encodes either a first state or second state, and which collectively encode an identifier, the two-dimensional identification being positioned along a side edge of the document and being configured to detect and correct any skew that occurred during generation of a scanned image of the document after having been marked by a user and find the stored definition file from among other stored definition files;
    outputting the mark-able document;
    scanning the mark-able document containing user-marks and generating and saving an image thereof;
    reading and decoding the two-dimensional identification;
    identifying the GUID based on the reading and decoding of the two-dimensional identification;
    accessing the definition file associated with the identified GUID;
    analyzing the image based on the definition file and the user-made marks on the mark-able document, including detecting and correcting any skew in scanning the mark-able document containing user-marks based on the reading and decoding of the two-dimensional identification; and
    outputting a result of the image analyzing operation.

2. The method of claim 1, wherein creating of the definition file comprises inputting at least one category, a plurality of mark-able items associated with the at least one category, and at least one formula defining relationships between the at least one category and the plurality of mark-able items.

3. The method of claim 2, wherein the inputting is performed using an interactive window displayed on a display associated with a computing device.

4. The method of claim 1, wherein identifying the GUID comprises decoding the two-dimensional identification for the mark-able document.

5. The method of claim 4, further comprising:
using the decoded two-dimensional identification, detecting whether the image is skewed, and if so, de-skewing the image.

6. A non-transitory medium containing a program for directing one or more processors to create a mark-able document, the program comprising:
instructions for creating a definition file defining the content and layout of, and instructions for processing user-made-marks on, the mark-able document;
instructions for automatically generating a globally unique identification (GUID) upon creation of the definition file, the GUID being associated with the definition file;
instructions for storing the definition file and the GUID;
instructions for creating a two-dimensional representation of the GUID, the two-dimensional identification containing a plurality of blocks, each of which encodes either a first state or second state, and which collectively encode an identifier, the two-dimensional identification being positioned along an edge of the document and being configured to detect and correct any skew that occurred during generation of a scanned image of the document after having been marked by a user and find the stored definition file from among other stored definition files;
instructions for outputting the mark-able document;
instructions for scanning the mark-able document containing user-marks and generating and saving an image thereof;
instructions for reading and decoding the -o-dimensional identification;
instructions for identifying the GUID based on the reading and decoding of the two-dimensional identification;
instructions for accessing the definition file associated with the identified GUID;
instructions for analyzing the image based on the definition file and the user-made marks on the mark-able document, including detecting and correcting any skew in scanning the mark-able document containing user-marks based on the reading and decoding of the two-dimensional identification; and
instructions for outputting a result of the image analyzing operation.

7. The medium of claim 6, wherein the instructions for creating the definition file comprises instructions for inputting at least one category, a plurality of mark-able items associated with the at least one category, and at least one formula defining relationships between the at least one category and the plurality of mark-able items.

8. The medium of claim 7, wherein the instructions for inputting renders an interactive window displayed on a display associated with a computing device.

9. The medium of claim 6, wherein the instructions for identifying the GUID comprises instructions for decoding the two-dimensional identification for the mark-able document.

10. The medium of claim 9, further comprising:
instructions for detecting whether the image is skewed, and if so, de-skewing the image, using the decoded two-dimensional identification.

* * * * *